(12) United States Patent
Fukazawa et al.

(10) Patent No.: US 11,042,743 B2
(45) Date of Patent: Jun. 22, 2021

(54) INFORMATION PROCESSING DEVICE, INFORMATION PROCESSING METHOD, AND PROGRAM FOR PREVENTING DETERIORATION OF VISUAL RECOGNITION IN A SCENE

(71) Applicant: SONY CORPORATION, Tokyo (JP)

(72) Inventors: Ryo Fukazawa, Kanagawa (JP); Kuniaki Torii, Kanagawa (JP); Takahiro Okayama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/770,588

(22) PCT Filed: Sep. 15, 2016

(86) PCT No.: PCT/JP2016/077348
§ 371 (c)(1),
(2) Date: Apr. 24, 2018

(87) PCT Pub. No.: WO2017/104198
PCT Pub. Date: Jun. 22, 2017

(65) Prior Publication Data
US 2018/0314889 A1 Nov. 1, 2018

(30) Foreign Application Priority Data

Dec. 14, 2015 (JP) .............................. JP2015-242850

(51) Int. Cl.
*G06F 3/01* (2006.01)
*G06K 9/00* (2006.01)
(Continued)

(52) U.S. Cl.
CPC ......... *G06K 9/00671* (2013.01); *G06F 3/013* (2013.01); *G06F 3/038* (2013.01);
(Continued)

(58) Field of Classification Search
None
See application file for complete search history.

(56) References Cited

U.S. PATENT DOCUMENTS

2011/0158478 A1* 6/2011 Yamada ............... G02B 6/0006
382/103
2014/0362111 A1* 12/2014 Kim ...................... G06T 19/006
345/633

(Continued)

FOREIGN PATENT DOCUMENTS

CN 102446210 A 5/2012
JP 2006-091390 A 4/2006
(Continued)

OTHER PUBLICATIONS

Shibata et al., A View Management Method for Mobile Mixed Reality Systems, EGVE Symposium, 2008, pp. 17-24.

*Primary Examiner* — Tize Ma
(74) *Attorney, Agent, or Firm* — Paratus Law Group, PLLC

(57) ABSTRACT

There is provided an information processing device, an information processing method, and a program, capable of preventing the deterioration of visual recognition in a scene where a plurality of content items associated with a real object are displayed, the information processing device including: a display control unit configured to output display information used to cause content associated with a real object to be displayed. The display control unit, in a case where a first area on which first content is displayed and a second area on which second content is displayed overlap at least partially, adjusts layout of the first content or the second content on a basis of layout information determined for each of the first content and the second content.

20 Claims, 17 Drawing Sheets

(51) Int. Cl.
*G06Q 50/00* (2012.01)
*G06F 3/0482* (2013.01)
*G06F 3/038* (2013.01)
*G06F 3/0481* (2013.01)

(52) U.S. Cl.
CPC .......... *G06F 3/0481* (2013.01); *G06F 3/0482* (2013.01); *G06Q 50/01* (2013.01)

(56) References Cited

U.S. PATENT DOCUMENTS

| | | | |
|---|---|---|---|
| 2015/0091780 A1* | 4/2015 | Lyren | G02B 27/017 |
| | | | 345/8 |
| 2015/0091943 A1 | 4/2015 | Lee et al. | |
| 2015/0207833 A1* | 7/2015 | Tsubotani | G06F 3/04842 |
| | | | 715/753 |
| 2016/0163052 A1* | 6/2016 | Kim | G06F 3/0483 |
| | | | 715/766 |
| 2016/0320622 A1* | 11/2016 | Yoshida | G06F 3/14 |
| 2016/0350484 A1* | 12/2016 | Son | G06F 19/321 |

FOREIGN PATENT DOCUMENTS

| | | |
|---|---|---|
| JP | 2010-238098 A | 10/2010 |
| JP | 2011-081556 A | 4/2011 |
| JP | 2012-053643 A | 3/2012 |
| JP | 2013-033308 A | 2/2013 |
| JP | 2013-196158 A | 9/2013 |
| JP | 2014-206904 A | 10/2014 |
| JP | 2015-191554 A | 11/2015 |
| WO | WO 2011/148885 A1 | 12/2011 |
| WO | WO 2014/196038 A1 | 12/2014 |
| WO | WO 2015/107625 A1 | 7/2015 |

\* cited by examiner

FIG. 9
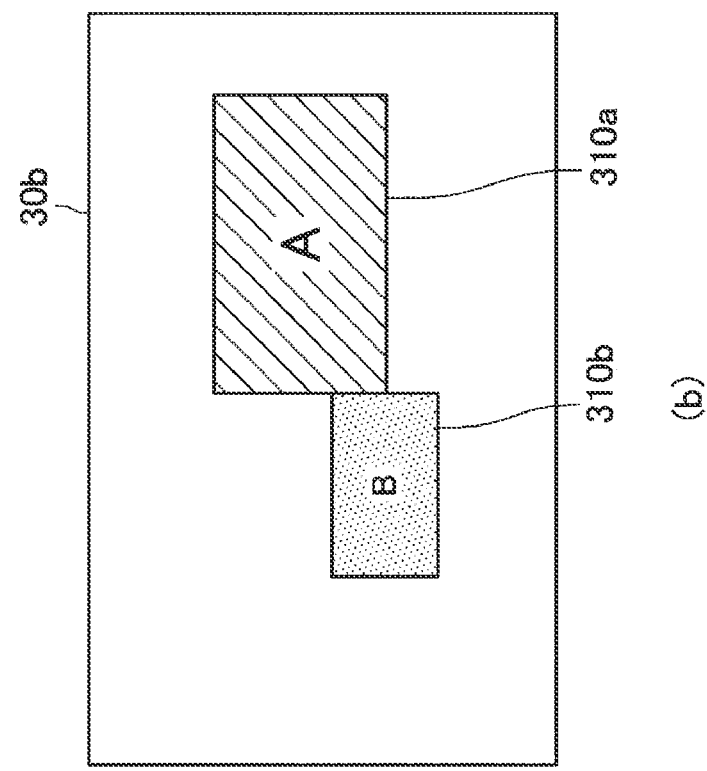
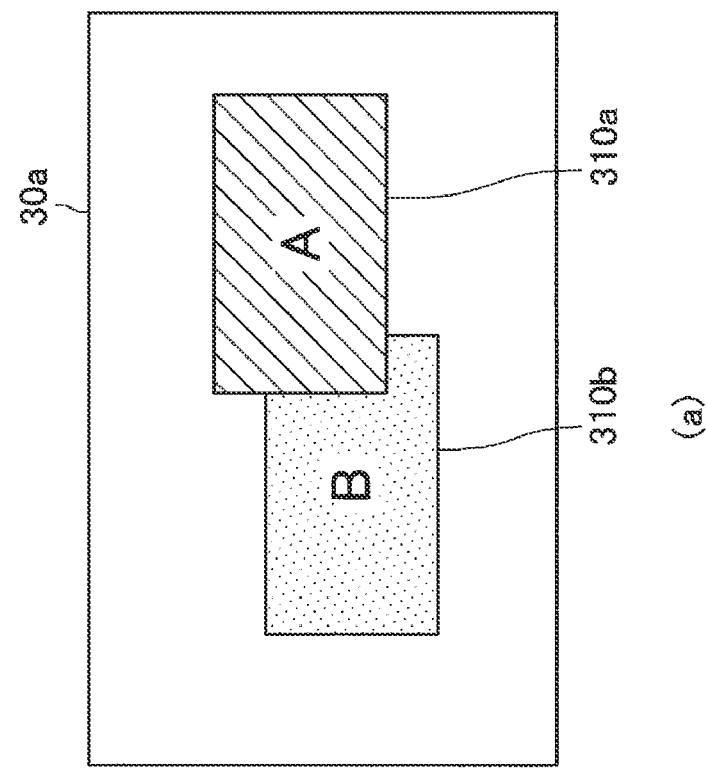

INFORMATION PROCESSING DEVICE, INFORMATION PROCESSING METHOD, AND PROGRAM FOR PREVENTING DETERIORATION OF VISUAL RECOGNITION IN A SCENE

CROSS REFERENCE TO PRIOR APPLICATION

This application is a National Stage Patent Application of PCT International Patent Application No. PCT/JP2016/077348 (filed on Sep. 15, 2016) under 35 U.S.C. § 371, which claims priority to Japanese Patent Application No. 2015-242850 (filed on Dec. 14, 2015), which are all hereby incorporated by reference in their entirety.

TECHNICAL FIELD

The present disclosure relates to an information processing device, an information processing method, and a program.

BACKGROUND ART

In related art, researches on a human interface that connects a real world with a virtual world, such as augmented reality (AR), are being conducted.

In one example. Patent Literature 1 below discloses a technique of causing the display position of a UI object to approach toward a user in response to recognition of a user's gesture.

CITATION LIST

Patent Literature

Patent Literature 1: JP 2014-127124A

DISCLOSURE OF INVENTION

Technical Problem

In the technique disclosed in Patent Literature 1, however, a plurality of UI objects are laid out independently. Thus, the plurality of UI objects are displayed in an overlapping manner in some cases, possibly resulting in the deterioration of the UI object's visual recognition.

In view of this, the present disclosure provides a novel and improved information processing device, information processing method, and program, capable of preventing the deterioration of visual recognition in a scene where a plurality of content items associated with a real object are displayed.

Solution to Problem

According to the present disclosure, there is provided an information processing device including: a display control unit configured to output display information used to cause content associated with a real object to be displayed. The display control unit, in a case where a first area on which first content is displayed and a second area on which second content is displayed overlap at least partially, adjusts layout of the first content or the second content on a basis of layout information determined for each of the first content and the second content.

In addition, according to the present disclosure, there is provided an information processing method including: outputting display information used to cause content associated with a real object to be displayed; and adjusting, by a processor, in a case where a first area on which first content is displayed and a second area on which second content is displayed overlap at least partially, layout of the first content or the second content on a basis of layout information determined for each of the first content and the second content.

In addition, according to the present disclosure, there is provided a program causing a computer to function as: a display control unit configured to output display information used to cause content associated with a real object to be displayed. The display control unit, in a case where a first area on which first content is displayed and a second area on which second content is displayed overlap at least partially, adjusts layout of the first content or the second content on a basis of layout information determined for each of the first content and the second content.

Advantageous Effects of Invention

According to the present disclosure as described above, it is possible to prevent the deterioration of visual recognition in a scene where a plurality of content items each of which is associated with the real object are displayed. Moreover, the effects described herein are not necessarily restrictive, or there may be any effect set forth herein.

BRIEF DESCRIPTION OF DRAWINGS

FIG. 9 is a diagram illustrated to describe an example of layout adjustment of content according to the embodiment.

MODE(S) FOR CARRYING OUT THE INVENTION

Figure 1:
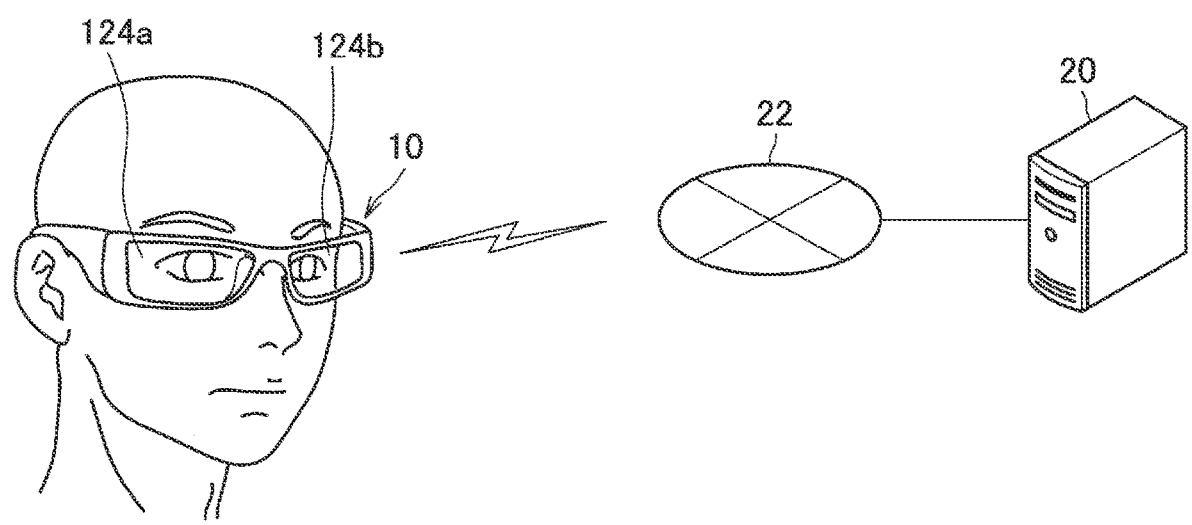
FIG. 1 is a diagram illustrated to describe an exemplary configuration of an information processing system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Moreover, the "mode for carrying out the invention" will be described according to the order of listing shown below.
1. Basic configuration of information processing system
2. Detailed description of embodiment
3. Hardware configuration
4. Modified examples

1. BASIC CONFIGURATION OF INFORMATION PROCESSING SYSTEM

The basic configuration of an information processing system according to an embodiment of the present disclosure is first described reference to FIG. 1. As illustrated in FIG. 1, the information processing system according to the present embodiment includes an HMD 10, a server 20, and a communication network 22.

1-1. HMD 10

The HMD 10 is an example of an information processing device according to the present disclosure. The HMD 10 is a device that controls the display of content on the basis of, in one example, a predetermined application installed therein. In one example, the HMD 10 first acquires one or more content items from the server 20 via the communication network 22 on the basis of the predetermined application. Then, the HMD 10 displays the acquired content on a display unit 124 described later. In one example, the HMD 10 generates a right eye image and a left eye image on the basis of the acquired content, and then displays the right eye image on a right eye display unit 124a and the left eye image on a left eye display unit 124b.

Here, the content is, in one example, AR content or the like. In addition, the content may be 2D content or 3D content (stereoscopic image).

Further, the predetermined application may be, in one example, an application that displays an AR advertisement, or may be an application allowing a social networking service (SNS) user to arrange content such as a memo linked to a place of the real world. Alternatively, the predetermined application may be an application that presents a description related to an object in the periphery of the user's current position or its relevant information. In one example, this application displays, on the head of another person located within the user's field of view, information such as the other person's name or affiliation in a superimposed manner, or displays a review, detailed information, or the like of a book arranged in the periphery in a superimposed manner.

Further, it is possible for the HMD 10 to activate a plurality of applications simultaneously, in one example, in accordance with the user's behavior. In one example, when the user is walking on the street, it is possible for the HMD 10 to activate simultaneously "route guidance application", "shop information application", "current location information presentation application", or the like.

Figure 2:
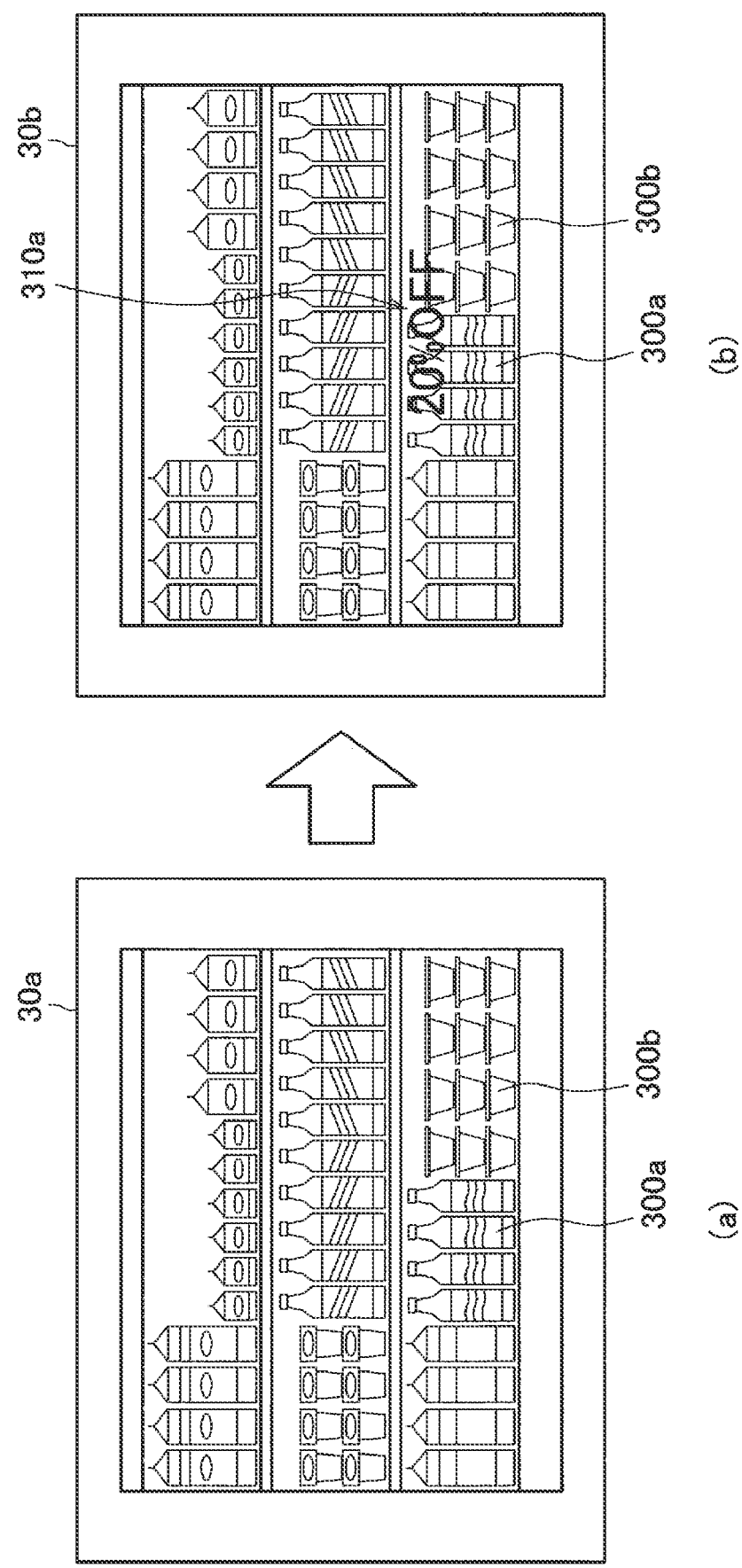
FIG. 2 is a diagram illustrated to describe a display example of content according to the embodiment.

FIG. 2 is a diagram illustrated to describe a display example of content 310 by the HMD 10. The example of FIG. 2 illustrates a display example of the content 310 in a scene where the user wearing the HMD 10 faces the commodity shelf in a supermarket. In one example, as illustrated in (a) of FIG. 2, the user visually recognizes a plurality of real objects 300 such as a milk carton 300a through the display unit 124. In this case, the HMD 10 first acquires a content item 310a (a text message of "20% OFF") associated with the real object 300a, in one example, from the server 20, and then, as illustrated in (b) of FIG. 2, displays the acquired content item 310a on the display unit 124. This makes it possible for the user to visually recognize the real object 300 and the content 310 simultaneously.

Moreover, as illustrated in FIG. 1, the HMD 10 is basically a see-through head-mounted display. In other words, the right eye display unit 124a and the left eye display unit 124b may be configured as a see-through display, but it is not limited to such an example, and the HMD 10 may be an opaque head mounted display.

1-2. Server 20

The server 20 is a device that stores a plurality of content items. In addition, in a case where a content acquisition request is received, in one example, from another device such as the HMD 10, it is possible for the server 20 to transmit the content to the other device on the basis of the received acquisition request.

1-3. Communication Network 22

The communication network 22 is a wired or wireless communication channel for information transmitted from a device connected to the communication network 22. Examples of the communication network 22 may include public line networks such as a telephone network, the Internet, and a satellite communication network, or various local area networks (LANs) and wide area networks (WANs) including Ethernet (registered trademark). In addition, the communication network 22 may include a leased line network such as Internet protocol-virtual private network (IP-VPN).

1-4. Summary of Problem

The configuration of the information processing system according to the present embodiment is described above. Meanwhile, in the known AR application, individual content items associated with an object (real object) to be superimposed in the real world are displayed independently. Thus, in one example, in a case where there are a plurality of objects to be superimposed or case where a plurality of content items are associated with the object to be superimposed, the plurality of content items can be displayed in an overlapped manner.

Figure 3:
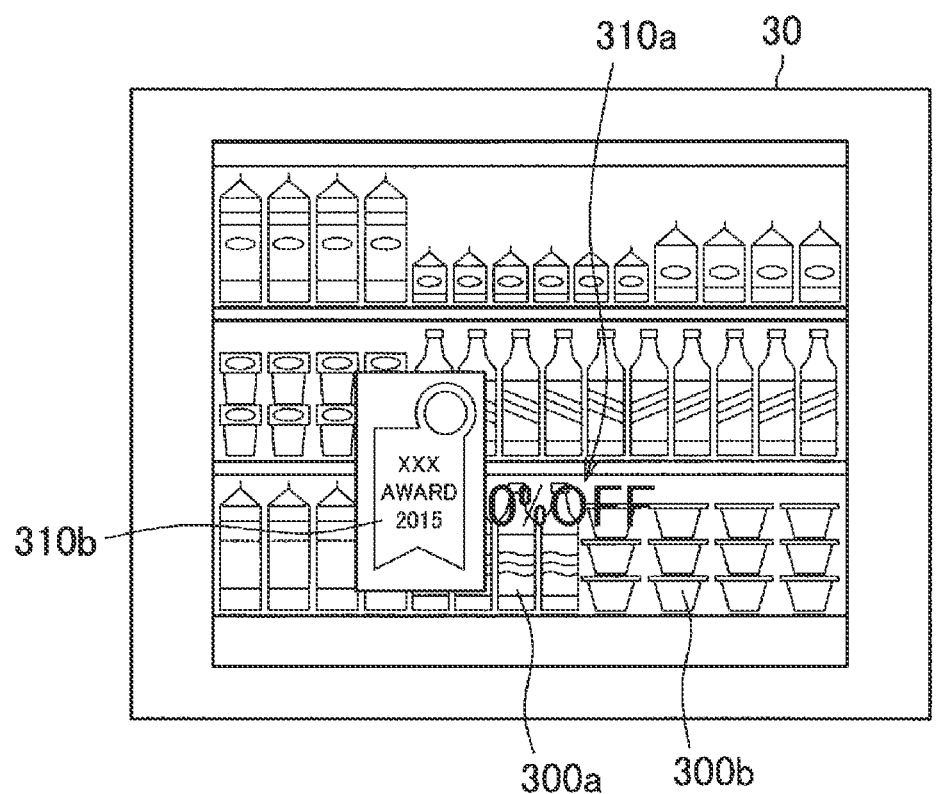
FIG. 3 is a diagram illustrated to describe a display example of content according to a comparative example of the present disclosure.

FIG. 3 is a diagram illustrated to describe a display example of a plurality of content items according to a comparative example of the present disclosure. Moreover, FIG. 3 is based on the assumption of a scene in which the user is directly facing the commodity shelf, which is similar to FIG. 2. In addition, the example illustrated in FIG. 3 is based on the assumption of a scene in which the content item 310a and the content item 310b are associated with the real object 300a. As illustrated in FIG. 3, in the comparative example of the present disclosure, the content item 310a and the content item 310b are displayed in a partially overlapped manner.

Thus, it is desirable to adjust a display or the like between content items to prevent the deterioration of visual recognition of content. However, in the AR content, the layout of content is performed depending on the position and size of the object to be superimposed in the real world. For this reason, it is difficult to determine uniformly and consistently the priority or processing order of the layout calculation.

Thus, the HMD 10 according to the present embodiment is developed with such circumstances as one viewpoint. It is possible for The HMD 10 to determine layout information on the basis of a predetermined index for each of a plurality of display target content items. Then, in a case where the areas where the plurality of content items are displayed overlap each other, it is possible for the HMD 10 to appropriately adjust the layout of the plurality of content items on the basis of the layout information determined for each of the plurality of content items.

2. DETAILED DESCRIPTION OF EMBODIMENT

2-1. Configuration

Figure 4:
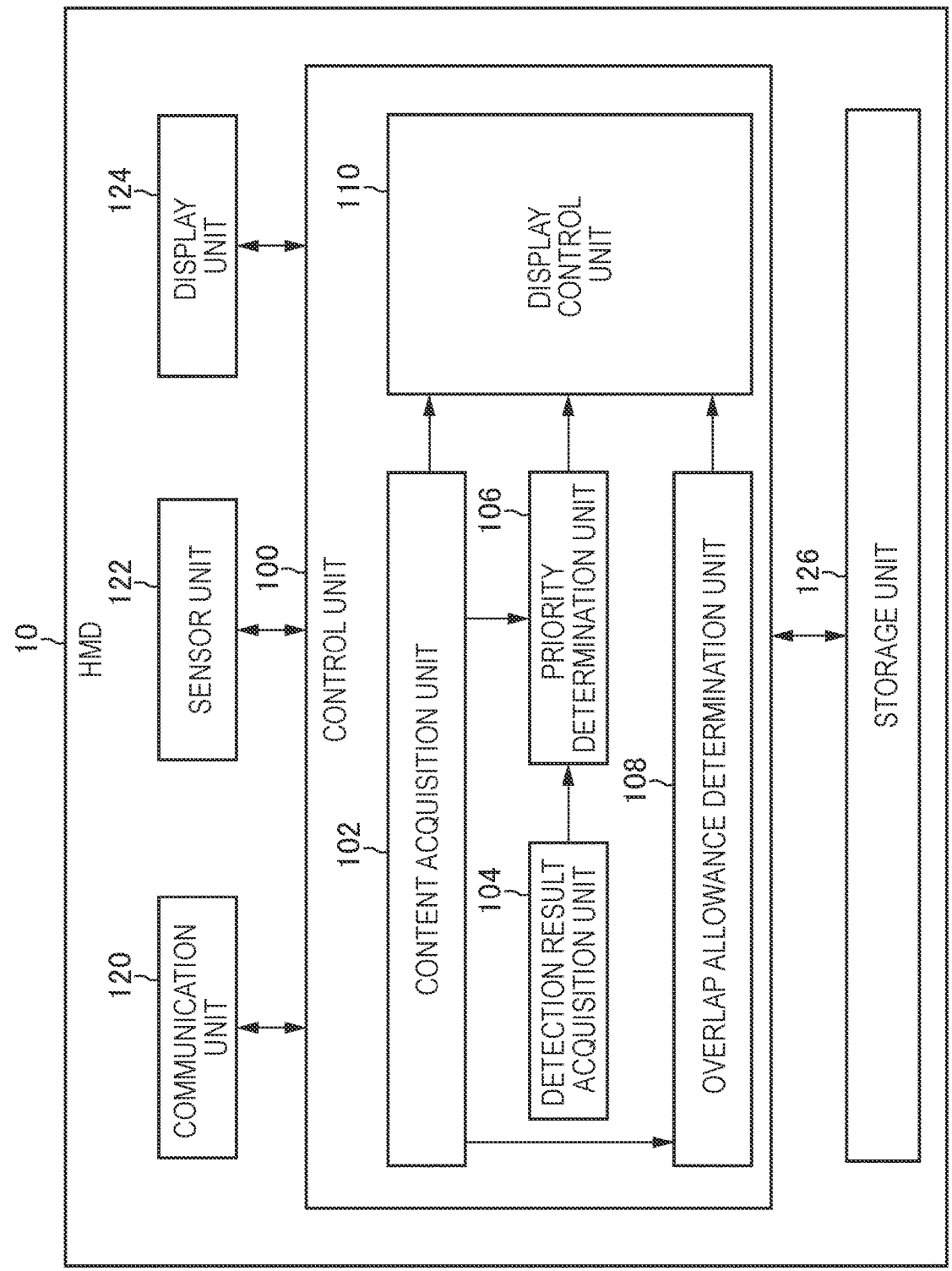
FIG. 4 is a functional block diagram illustrating an exemplary configuration of an HMD 10 according to an embodiment of the present disclosure.

The configuration of the HMD 10 according to the present embodiment is now described in detail. FIG. 4 is a functional block diagram illustrating the configuration of the HMD 10. As illustrated in FIG. 4, the HMD 10 includes a control unit 100, a communication unit 120, a sensor unit 122, a display unit 124, and a storage unit 126.

2-1-1. Control Unit 100

The control unit 100 controls the overall operation of the HMD 10 by using hardware, such as a central processing unit (CPU) 150 and a random access memory (RAM) 154 to be described later, which are incorporated in the HMD 10. In addition, as illustrated in FIG. 4, the control unit 100 includes a content acquisition unit 102, a detection result acquisition unit 104, a priority determination unit 106, an overlap allowance determination unit 108, and a display control unit 110.

2-1-2. Content Acquisition Unit 102

2-1-2-1. Acquisition of Content

The content acquisition unit 102 acquires the display target content from, in one example, the server 20. Here, the display target content includes, in one example, first content associated with a first real object and second content associated with a second real object. Moreover, the first real object and the second real object may be the same object or different objects.

In one example, the content acquisition unit 102 acquires, for each real object included in the field-of-view range of the user who wears the HMD 10, the content associated with the real object.

2-1-2-2. Acquisition of Content Information

Further, the content acquisition unit 102 acquires information associated with the display target content (hereinafter referred to as content information) from, in one example, the server 20. Here, the content information is an example of first information and second information in the present disclosure. The content information is, in one example, information indicating characteristics of content. In one example, the content information includes information such as the type, genre, or title of the relevant content.

Moreover, in a case where the content or the content information is stored in the storage unit 126, it is possible for the content acquisition unit 102 to acquire the display target content or content information from the storage unit 126 instead of the server 20.

2-1-3. Detection Result Acquisition Unit 104

The detection result acquisition unit 104 acquires a result sensed by the sensor unit 122. In one example, the detection result acquisition unit 104 acquires a detection result such as the speed, acceleration, inclination, or position information of the HMD 10. In addition, the detection result acquisition unit 104 acquires an image captured by the sensor unit 122.

Further, the detection result acquisition unit 104 detects individual real objects included in the field-of-view range of the user wearing the HMD 10. In one example, the detection result acquisition unit 104 recognizes a real object on the basis of the image of the real object that is captured by the sensor unit 122, the depth information of the detected real object, or the like. In addition, in a case where a real object is detected, it is also possible for the detection result acquisition unit 104 to acquire information associated with the real object from, in one example, the server 20.

Further, the detection result acquisition unit 104 acquires, on the basis of an image of a marker captured by the sensor unit 122, information related to the display setting (hereinafter referred to as display setting information) of the content associated with the marker from, in one example, the server 20. The display setting information includes, in one example, a setting value such as a display position or display size of the content.

2-1-4. Priority Determination Unit 106

2-1-4-1. Characteristics of Content

The priority determination unit 106 is an example of a layout information determination unit according to the present disclosure. The priority determination unit 106 determines the layout information of the display target content on the basis of the predetermined index. Here, the layout information is, in one example, information used for determining the content whose layout is to be adjusted. In one example, the layout information includes the priority of content, the overlap allowance of content, the characteristics of content (e.g., whether to include a transparent portion or whether to include text information, etc.), or the like. In addition, the predetermined index is, in one example, characteristics of the display target content. In one example, the priority determination unit 106 determines, on the basis of the type of the display target content, the priority of the content. Here, the type of the content is, in one example, a 3D model, an image, text, or the like.

The following description is given by focusing on an example in which the priority determination unit 106 determines the priority of the display target content. Moreover, the overlap allowance of content is determined by the overlap allowance determination unit 108 to be described later.

In one example, it is also possible for the priority determination unit 106 to determine one priority for one content item, or to determine the priority individually for each portion included in one content item. Moreover, the following description is given by focusing on an example in which the priority determination unit 106 determines one priority for one content item.

Meanwhile, whether the exactness of the display position of content is necessary may vary depending on the type of the content. In one example, it is often necessary for game characters, buildings, or the like to be arranged exactly in accordance with the place of the real world. In addition, in one example, an image or the like that presents a label or additional information describing the name or the like of a real object is often unnecessary to have exactness of the display position as long as the relationship between the image and the object to be superimposed (real object) is clear.

Thus, in one example, the priority determination unit 106 preferably determines priority levels of the display target content in such a manner that the content has the priority in the descending order of a 3D model with exact display position, an image with exact display position, a text with exact display position, a 3D model with less exact display position, an image with less exact display position, and a text with less exact display position. Here, the 3D model with exact display position is, in one example, a virtual character or building displayed to be present in the real world. In addition, the image with exact display position is, in one example, an image or the like attached to a real object, such as a building image or a topographic image. In addition, the text with exact display position is a text message or the like attached to a real object. In addition, the 3D model with less exact display position is a 3D model that can be placed freely by the user, such as a character or tool floating in the air. In addition, the image with less exact display position is, in one example, an image, a thumbnail, or the like for supplementary explanation. In addition, the text with less exact display position is, in one example, a label, or the like.

2-1-4-2 Evaluation in SNS

Alternatively, the predetermined index may be evaluation information related to the display target content in a predetermined SNS. In one example, in the case where the activating application is an SNS application, the priority determination unit 106 determines the priority of content in such a manner that the larger the value indicating the user's evaluation for the display target content, such as the number of "like" counts given in the predetermined SNS is, the higher the priority is.

Moreover, in a modified example, the server 20, instead of the HMD 10, may determine the priority of content on the basis of the evaluation information related to the content in the predetermined SNS (in a similar manner to that described above). Then, it is possible for the HMD 10 to acquire the determined priority from the server 20.

2-1-4-3. Advertising Rate

Alternatively, the predetermined index may be an advertising rate related to the display target content. In one example, in the case where the activating application is an AR advertisement application, the priority determination unit 106 determines the priority of content in such a manner that the higher the amount of the advertising rate related to the display target content is, the higher the priority is. Moreover, the information of the advertising rate related to the content may be stored in the server 20 or may be stored in the storage unit 126.

Moreover, in a modified example, the server 20, instead of the HMD 10, may determine the priority of content on the basis of the advertising rate (in a similar manner to that described above). Then, it is possible for the HMD 10 to acquire the determined priority from the server 20.

2-1-4-4. Visual Information

Position of Gaze Point

Alternatively, the predetermined index may be information related to the vision of the user. In one example, the priority determination unit 106 determines the priority of the display target content on the basis of the detection of the position of the user's gaze point. In one example, the priority determination unit 106 calculates the priority of display target content A ($S_A$) on the basis of the distance between the detected position of the user's gaze point and the display position of the content A as shown in Formula (1) below.

[Math. 1]

$$S_A = \frac{a}{\sqrt{(x_a - x_{eye})^2 + (y_a - y_{eye})^2 + (z_a - z_{eye})^2}} \quad \text{Formula (1)}$$

position of user's gaze point: $P_{eye}(x_{eye}, y_{eye}, z_{eye})$, position of content A: $P_a(x_a, y_a, z_a)$ In Formula (1), "a" is a predetermined constant. According to this determination example, the priority of the content is determined in such a manner that the smaller the distance between the position of the gaze point and the display target content is, the higher the priority is.

Figure 5:
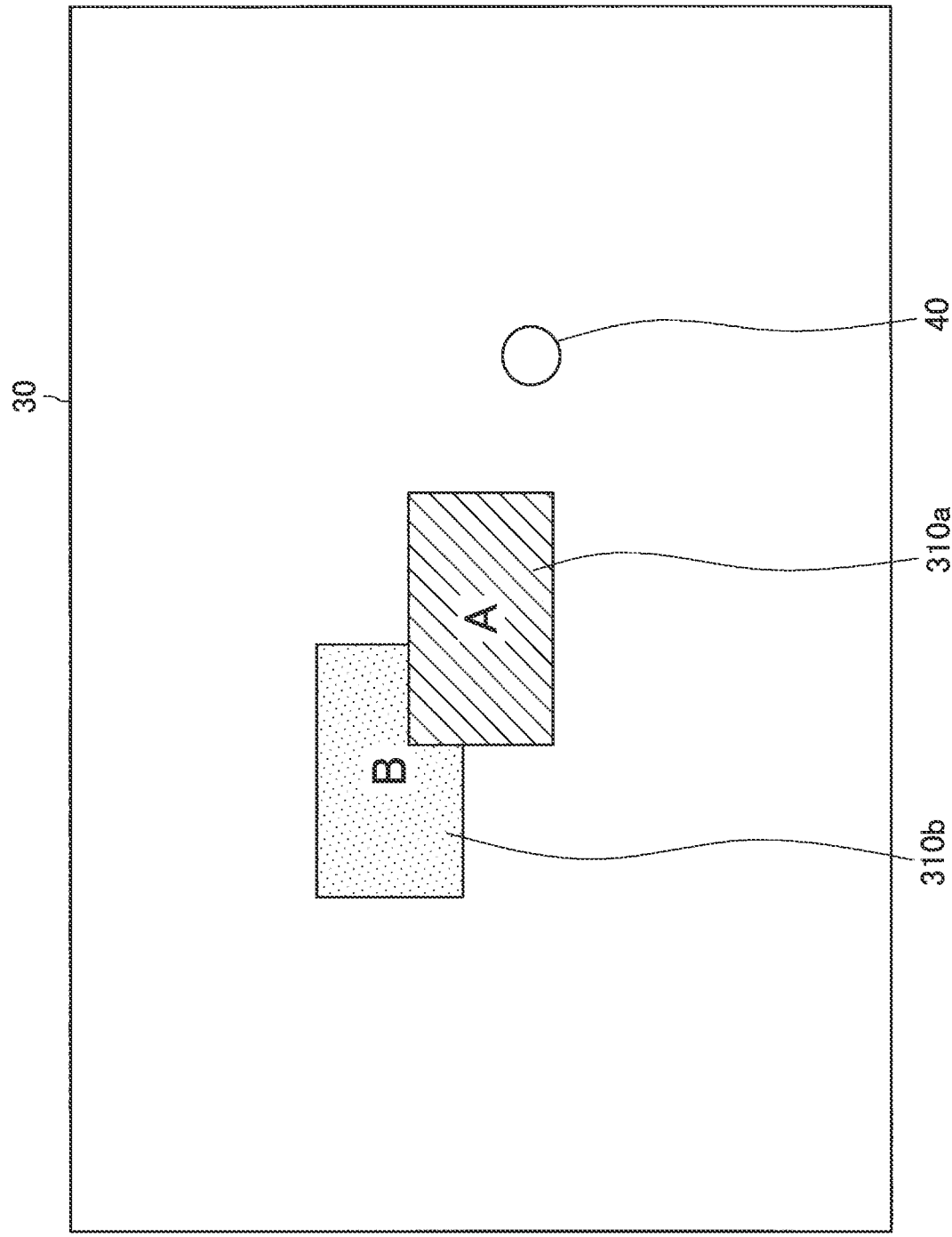
FIG. 5 is a diagram illustrated to describe an example in which two content items are displayed on a display screen 30, according to the embodiment.

Moreover, although Formula (1) shows an example in which the position of the gaze point is a position on the three-dimensional space, it is not limited to this example and may be a position on a display screen. FIG. 5 is a diagram illustrated to describe an example of two content items 310 displayed on a display screen 30 and the positions of a gaze point 40 on the display screen 30. In the example illustrated in FIG. 5, the content item 310a is closer to the gaze point 40 than the content item 310b. Thus, it is possible for the priority determination unit 106 to determine individually the priority of the content item 310a and the priority of the content item 310b in such a manner that the priority of the content item 310a is higher than that of the content item 310b.

Central Portion on Display Screen

Alternatively, it is assumed that the central portion of the display screen is the center of the user's field of view, and the priority determination unit 106 may determine the priority of the content on the basis of the distance between the central portion of the display screen and the display target content. In one example, the priority determination unit 106 determines the priority of the content in such a manner that the smaller the distance between the central portion of the display screen and the display target content is, the higher the priority is.

2-1-4-5. Behavior Recognition

Alternatively, the predetermined index may be a result of recognition of the user's behavior. In one example, every time the user's behavior is recognized, the priority determination unit 106 dynamically determines the priority of the display target content in such a manner that the priority of the content strongly related to the recognized behavior has an increased level. In one example, in the case where it is recognized that the user is moving, the priority determination unit 106 determines, with respect to the content presenting parking information or location information, the priority of the content in such a manner that the closer the user's current position to the destination is, the higher the priority is. Alternatively, the priority determination unit 106 may determine, with respect to the content presenting traffic information and resting location information, the priority of the content in such a manner that the priority is higher in the case where it is recognized that the destination is in the process of being moved to the destination.

2-1-4-6. User's Interest

Alternatively, the predetermined index may be a level of the user's interest. In one example, the priority determination unit 106 determines the priority of the display target content in such a manner that the higher the level of the user's interest is, the higher the priority is. Moreover, it is possible for the priority determination unit 106 to calculate the level of the user's interest in the display target content on the basis of, in one example, the usage history of the application, the browsing history of the content, or the like. Here, the usage history of the application or the browsing history of the content may be the history of the user who wears the HMD 10 or may be a history of a plurality of users using a predetermined service.

Further, the priority determination unit 106 may calculate the level of the user's interest in the display target content further depending on the place where the user is located.

2-1-4-7. Environmental Information

Alternatively, the predetermined index may be information related to the environment in which the user is located. In one example, it is possible for the priority determination unit 106 to determine the priority of the display target content depending on the color of an object located in the periphery of the user.

2-1-4-8. Device Information

Alternatively, the predetermined index may be information related to a display device, such as the HMD 10. In one example, it is possible for the priority determination unit 106 to determine the priority of the display target content depending on the size of a screen of the display device. In one example, in a case where the size of the screen is equal to or larger than a predetermined size, the priority determination unit 106 may set the priority of text information to a higher level. In addition, in a case where the size of the screen is smaller than the predetermined size, the priority determination unit 106 may set the priority of an image to the higher level. In the case where the screen size is small, the text is typically difficult to read. According to this control example, in the case where the screen size is small, it is possible to display the image preferentially than text.

2-1-4-9. Plurality of Indices

Alternatively, it is also possible for the priority determination unit 106 to determine the priority (final value) of the content on the basis of the priority determined for the plurality of indices among the above-described predetermined indices with respect to the display target content. In one example, the priority determination unit 106 calculates the weighted sum of the priorities determined for the respective plurality of indices and determines the calculated value as the priority of content A ($S_A$), as shown in Formula (2) below.

[Math. 2]

$$S_A = \sum_{i=1}^{n} S_i \cdot w_i \quad \text{Formula (2)}$$

In Formula (2), "$S_i$" is the priority of content A that is determined for an index i. In addition, "$w_i$" is the weight of the index i. Moreover, the value of $w_i$ may be predetermined or dynamically determined. In one example, the value of $w_i$ can be dynamically determined depending on the type of the activating application or characteristics of the display target content.

2-1-5. Overlap Allowance Determination Unit 108

The overlap allowance determination unit 108 is an example of a layout information determination unit according to the present disclosure. The overlap allowance determination unit 108 determines the overlap allowance related to the content on the basis of the content information of the display target content. In one example, the overlap allowance determination unit 108 determines the overlap allowance related to the content depending on whether the display target content has an overlap prohibition area. In one example, in a case where the display target content has the overlap prohibition area, the overlap allowance determination unit 108 is prevented from overlapping with other content in the overlap prohibition area.

Here, the overlap prohibition area can be set, in one example, in an area including information that necessitates for issuing a notification to the user, such as system error information. Alternatively, the overlap prohibition area may be determined depending on characteristics of the display target content. In one example, an area of text included in the content may be set as the overlap prohibition area. Alternatively, in a case where the content has a tag such as html, an area including information of high importance, such as title or alert, can be set as the overlap prohibition area. Alternatively, an area within a predetermined range centered on the detected user's gaze point can be dynamically set as the overlap prohibition area.

2-1-6. Display Control Unit 110

2-1-6-1. Layout Adjustment

In a case where areas where a plurality of display target content items are displayed (hereafter may be referred to as a content display area in some cases) overlap each other at least partially, the display control unit 110 adjusts the layout of one or more content items among the plurality of content items on the basis of the priority determined for each of the plurality of content items. Here, the layout of content includes the position, size, display color, or shape of the content. In one example, the display control unit 110 may change the arrangement, change the size, change the display color (e.g., to make it transparent), or add a modification in the periphery of the content.

In one example, in a case where a plurality of display target content items at a preset display position and with a preset display size, the display control unit 110 first determines whether the display areas of the plurality of content items overlap each other. Then, in a case where it is determined that the display areas of the plurality of content items overlap each other at least partially, the display control unit 110 adjusts the layout of one or more content items among the plurality of content items on the basis of the priority determined for each of the plurality of content items.

In one example, in the case where the display areas of the plurality of content items overlap each other, the display control unit 110 changes the display position of one or more of the plurality of content items on the basis of the priority determined for each of the plurality of content items. In one example, the display control unit 110 changes, with respect to the plurality of content items, the display position of the content in such a manner that the display position of the content with the determined lower priority is prevented from overlapping the display area of the content with the higher priority.

Figure 6:
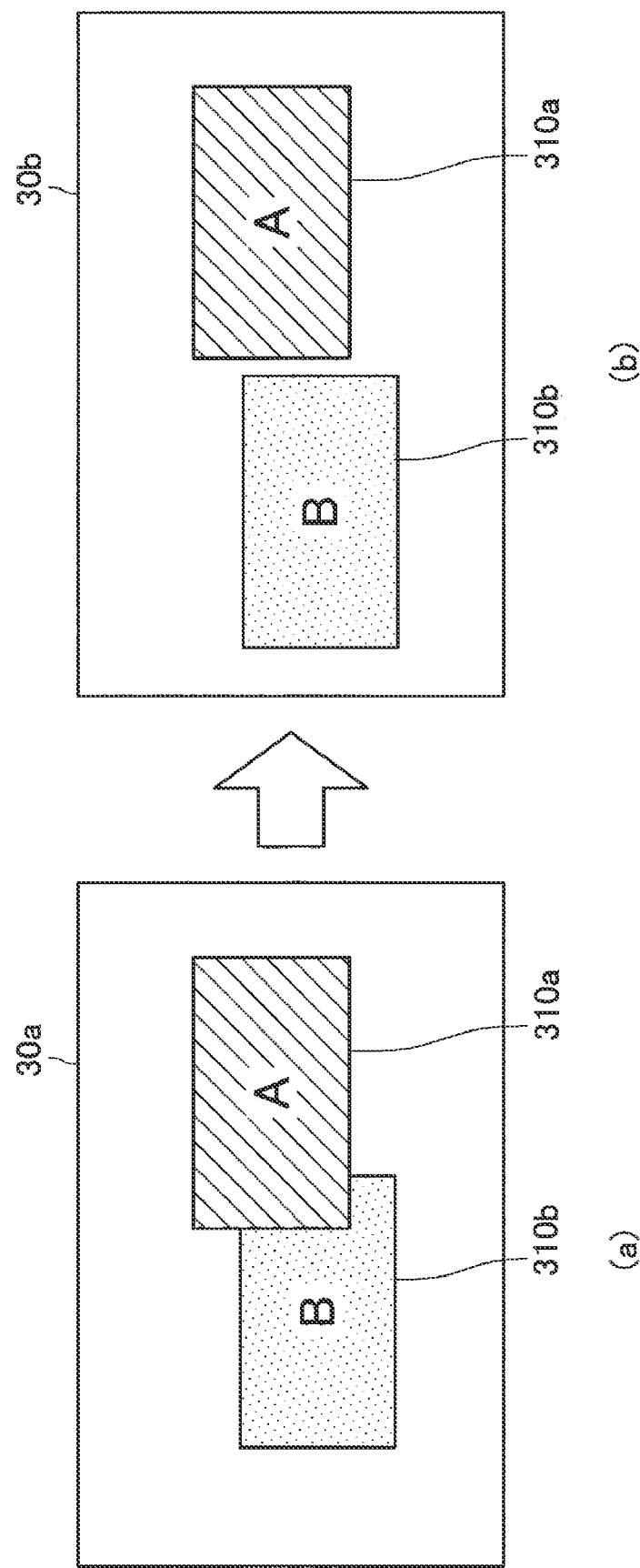
FIG. 6 is a diagram illustrated to describe an example of layout adjustment of content according to the embodiment.

The description is now given of the functions described above in more detail with reference to FIG. 6. FIG. 6 is a diagram illustrated to describe, in a case where the display areas of the two content items 310 overlap each other, an example of changing the display positions of the content items 310. Moreover, FIG. 6 is based on the assumption that the priority determined for the content item 310*a* is higher than the priority determined for the content item 310*b* (moreover, it is also similarly applied to FIGS. 7 to 9 to be described later). In this case, as illustrated in (b) of FIG. 6, the display control unit 110 moves the display position of the content item 310*b* from its initial position so as not to overlap the display area of the content item 310*a*.

Alternatively, the display control unit 110 changes a display mode of the outer peripheral portion of one or more of the plurality of content items on the basis of the priority determined for each of the plurality of content items. In one example, the display control unit 110 causes the outer peripheral portion of the content determined to have higher priority among the plurality of content items to be highlighted. In one example, the display control unit 110 may add a background display (e.g., a rectangle) to the content determined to have higher priority, make the outer peripheral portion of the content transparent, or change the color, pattern, or the like of the outer peripheral portion.

Figure 7:
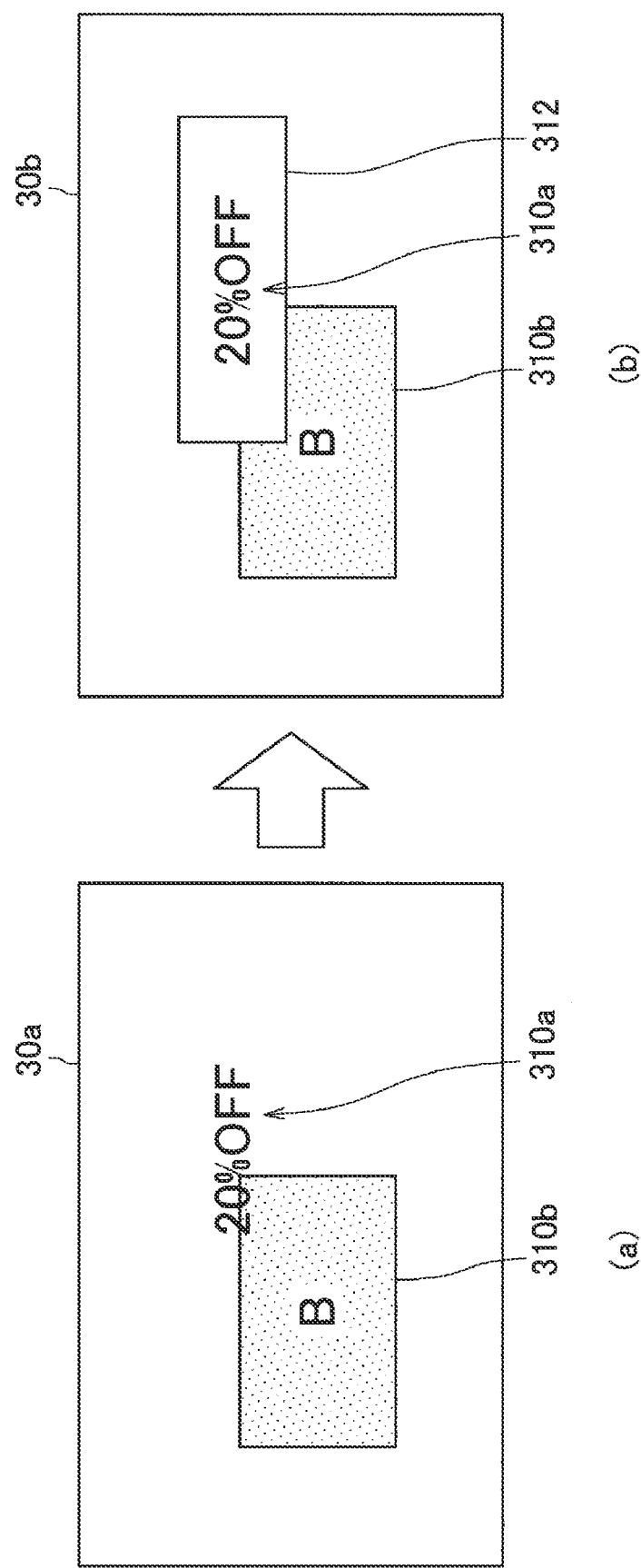
FIG. 7 is a diagram illustrated to describe an example of layout adjustment of content according to the embodiment.

FIG. 7 is a diagram illustrated to describe an example of adding a background display 312 to the content item 310*a* in the case where the display areas of the two content items 310 overlap each other. Moreover, FIG. 7 illustrates an example in which the content item 310*a* is text. In this case, as illustrated in (b) of FIG. 7, the display control unit 110 adds the background display 312 to the content item 310*a*. Moreover, as illustrated in (b) of FIG. 7, in the area where the background display 312 and the content item 310*b* overlap each other, the background display 312 can be displayed in front of the content item 310*b*. According to this adjustment example, it is possible for the user to visually recognize clearly the content determined to have higher priority.

Alternatively, the display control unit 110 changes the overlap relationship (front-and-back relationship) of the plurality of content items on the basis of the priority determined for each of the plurality of content items. In one example, the display control unit 110 changes the overlap relationship (from the predetermined overlap relationship) of the plurality of content items in such a manner that, as the content is determined to have higher priority, the content is displayed closer to the front.

Figure 8:
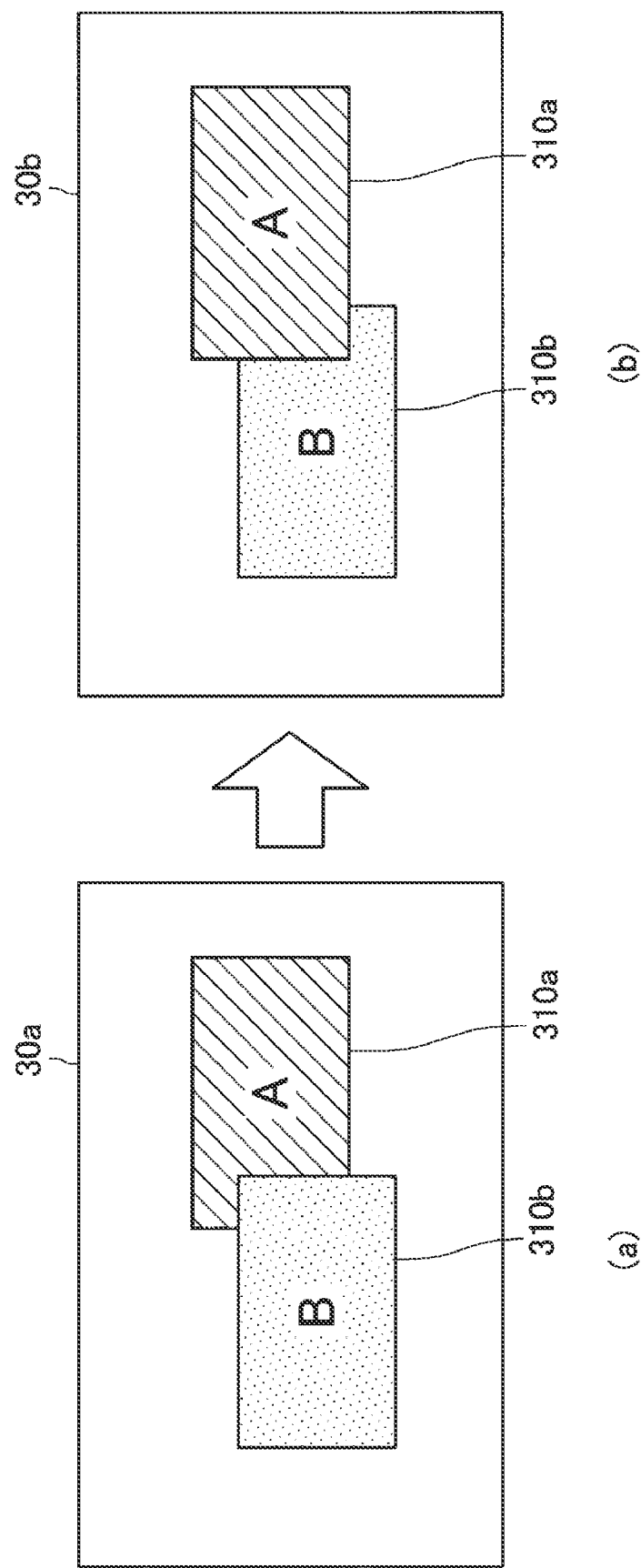
FIG. 8 is a diagram illustrated to describe an example of layout adjustment of content according to the embodiment.

FIG. 8 is a diagram illustrated to describe an example of changing the overlap relationship of content in the case where the display areas of the two content items 310 overlap each other. Moreover, as illustrated in (a) of FIG. 8, in the initial state, it is assumed that the content item 310*b* overlaps with the content item 310*a* in such a manner to be closer to the front than the content item 310*a*. In this case, as illustrated in (b) of FIG. 8, the display control unit 110 changes the overlap relationship of the two content items 310 in such a manner that the content items 310*a* is closer to the front than the content items 310*b*.

Alternatively, the display control unit 110 changes the display size of one or more of the plurality of content items on the basis of the priority determined for each of the plurality of content items. In one example, with respect to the plurality of content items, the display control unit 110 reduces the display size of the content with the lower priority in such a manner to be prevented from overlapping with the display area of the content with the higher priority.

FIG. 9 is a diagram illustrated to describe an example of reducing the display size of the content item 310*b* in the case where the display areas of the two content items 310 overlap each other. In this case, as illustrated in (b) of FIG. 9, the display control unit 110 reduces the display size of the content item 310*b* from its initial display size in such a manner to be prevented from overlapping with the display area of the content item 310*a*.

Moreover, in a modified example, the display control unit 110 may change the movement amount of the content's display position or the reduction amount of the content's display size depending on difference between the priorities determined for the respective plurality of content items whose display areas overlap.

In another modified example, the display control unit 110 may change the adjustment of the layout depending on a change in the detected user's gaze (e.g., the position information of a gaze point). In one example, in a case where the position of the gaze point changes after the layout adjustment, the display control unit 110 may further move the display position of the content.

Determination of Method of Adjusting Layout

Further, it is also possible for the display control unit 110 to select a method of adjusting the layout of content on the basis of the content information. In one example, the display control unit 110 determines a method of adjusting the layout of content on the basis of a plurality of types of content items whose display areas overlap. In one example, in a case where the type of two overlapping content items is text, the display control unit 110 may move the display position of the text (content) with the lower priority in such a manner to be prevented from overlapping with the display area of the text with the higher priority. In addition, in a case where the text and an image or a 3D model overlap in front of the image or the 3D model, the display control unit 110 may add a background display to the text. In addition, in a case where an image or a 3D model and the text overlap in front of the text, the display control unit 110 may move the display position of the text in such a manner to be prevented from overlapping with the image or the 3D model. In addition, in a case where images or 3D models overlap each other, the display control unit 110 may be unnecessary to perform adjustment of the layout (optional matter).

Incorporation of Overlap Allowance

Alternatively, it is possible for the display control unit 110 to adjust the layout of one or more among a plurality of content items whose display areas overlap each other, further on the basis of the overlap allowance determined by the overlap allowance determination unit 108. In one example, in a case where some display target content items have an overlap prohibition area, the display control unit 110 may adjust the layout of one or more among the plurality of display target content items in such a manner to prevent from overlapping with another content item in the overlap prohibition area.

Figure 10:
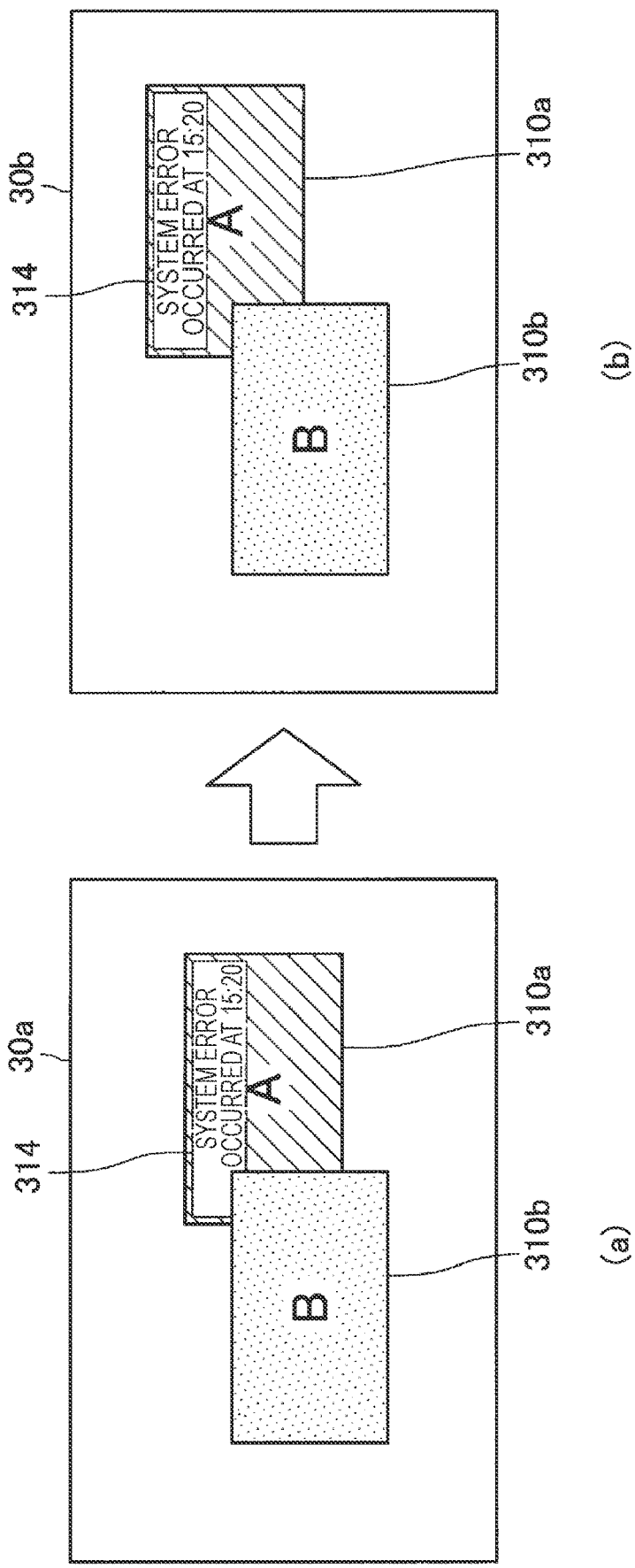
FIG. 10 is a diagram illustrated to describe an example of layout adjustment in a case where a content item A has an overlap prohibition region, according to the embodiment.

FIG. 10 is a diagram illustrated to describe an example of adjusting the layout of the content item 310b in a case where the content item 310a has an overlap prohibition area 314. Moreover, the example illustrated in FIG. 10 is based on the assumption that the content item 310b determined to have a priority higher than that of the content item 310a. In one example, as illustrated in (b) of FIG. 10, the display control unit 110 moves the display position of the content item 310a in such a manner that the content item 310a does not overlap the content item 310b in the overlap prohibition area 314. Moreover, FIG. 10 illustrates an example in which the display position of the content item 310a is moved upward in FIG. 10, but the movement direction is not limited to a particular direction. In one example, the display control unit 110 may move the content item 310a in the right direction or the upper right direction in FIG. 10.

2-1-6-2. Display of Content

Further, after the adjustment of the layout of the display target content is completed, the display control unit 110 causes the display target content to be displayed on the display screen. Furthermore, at this event, it is possible for the display control unit 110 to cause a display indicating the association between the content whose layout is adjusted and the real object associated with the content to be displayed.

Display Example Upon Changing Display Position

Figure 11:
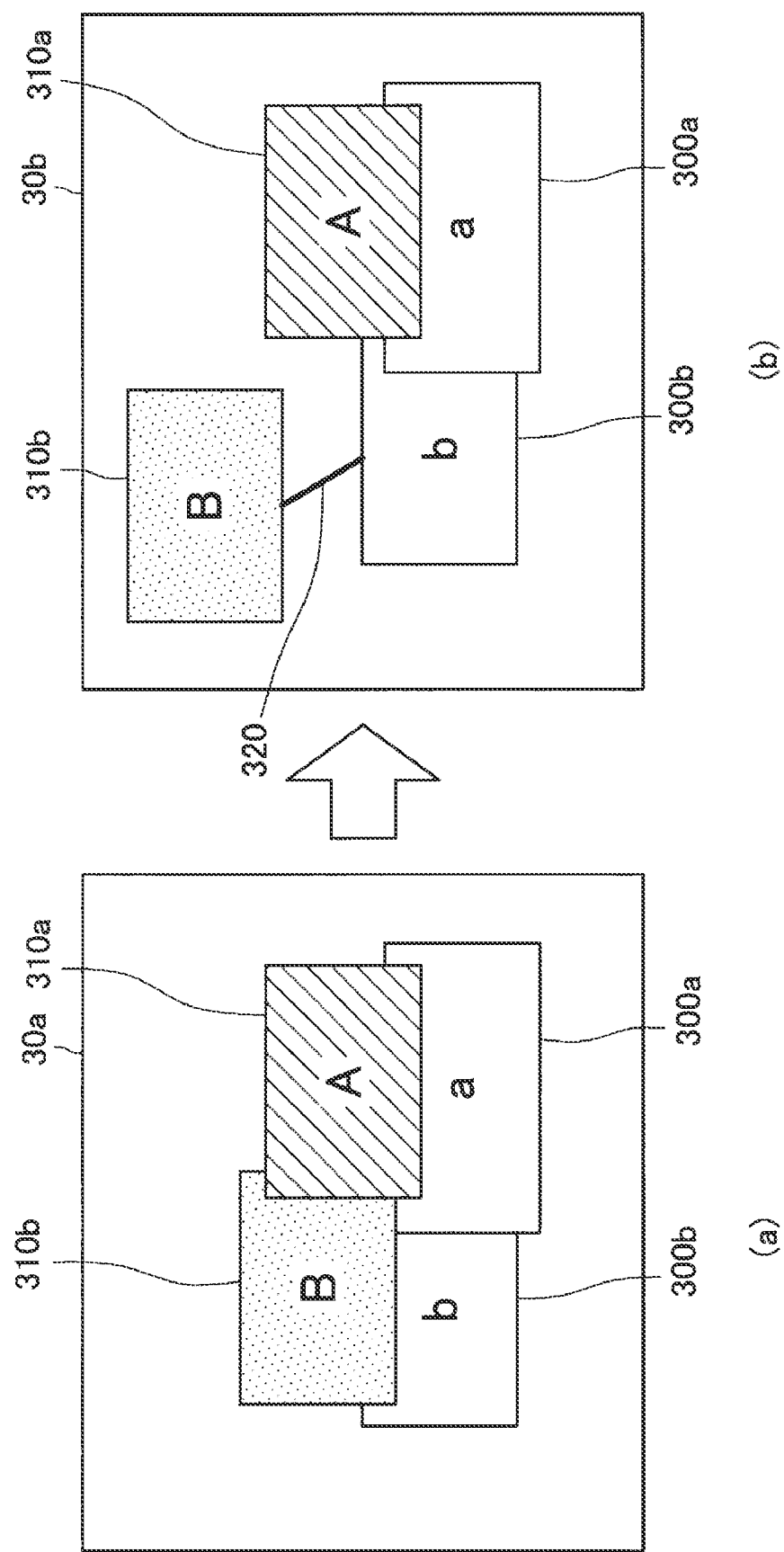
FIG. 11 is a diagram illustrated to describe a display example in a case where the position of a content item B is moved, according to the embodiment.
Figure 12:
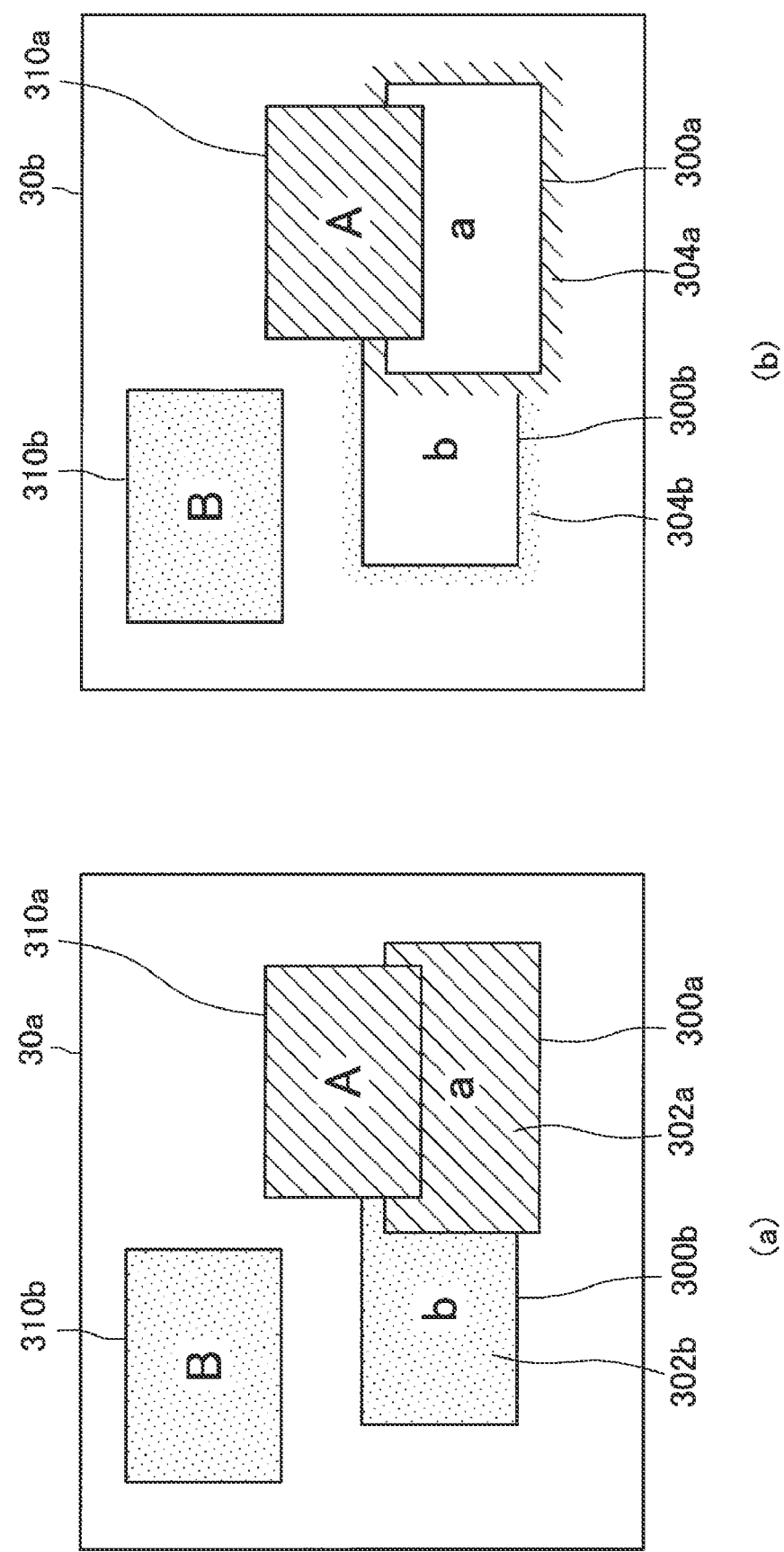
FIG. 12 is a diagram illustrated to describe a display example in a case where the position of a content item B is moved, according to the embodiment.

In one example, in the case where the display control unit 110 changes the display position of the display target content, the display control unit 110 causes a display indicating the association with the real object associated with the content to be displayed. The function described above is now described in more detail with reference to FIGS. 11 and 12. Moreover, FIGS. 11 and 12 illustrate display examples (three types) of a display indicating the association between the content item 310b and a real object 300b in the case where the display position of the content item 310b is moved. In addition, FIGS. 11 and 12 are based on the assumption that the real object 300a and the content item 310a are associated with each other and a real object 300b and the content item 310b are associated with each other.

In one example, as illustrated in (b) of FIG. 11, the display control unit 110 causes a line 320 connecting the content item 310b with the real object 300b to be displayed on a display screen 30b. Alternatively, as illustrated in (a) of FIG. 12, the display control unit 110 superimposes a color or pattern having an identical or similar type to the content item 310a onto the real object 300a, and superimposes a color or pattern having an identical or similar type to the content item 310b onto the real object 300b. Alternatively, as illustrated in (b) of FIG. 12, the display control unit 110 superimposes a decoration 304a having identical or similar color glow or the like to the content item 310a onto the outer peripheral portion of the real object 300a, and superimposes a decoration 304b having identical or similar color glow or the like to the content item 310b onto the outer peripheral portion of the real object 300b. According to these display examples, even in the case where the display position of the content item 310b is moved from its initial position, it is possible for the user to easily understand that the content item 310b and the real object 300b are associated with each other.

Example of Display Upon Changing Overlap Relationship

Alternatively, in a case where the overlap relationship between the display target content items is changed, the display control unit 110 further causes a display indicating a change in the overlap relationship to be displayed. The function described above is now described in more detail with reference to FIGS. 13 and 14. Moreover, FIGS. 13 and 14 illustrate display examples (three types) of a display indicating a change in the overlap relationship in the case where the overlap relationship is changed in such a manner that the content item 310b is closer to the front than the content item 310a.

Figure 13:
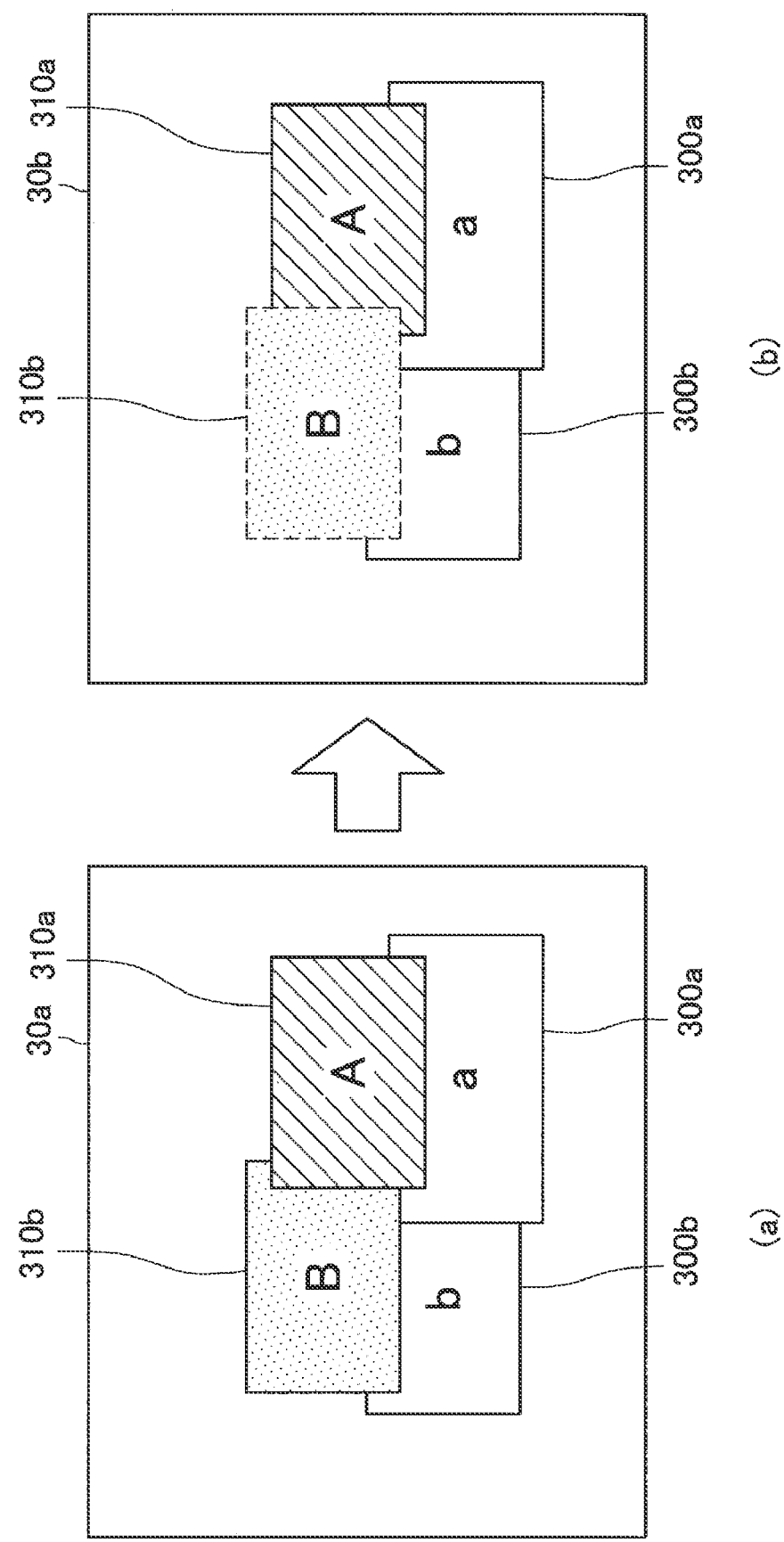
FIG. 13 is a diagram illustrated to describe a display example of content in a case where the overlap relationship between content items A and B is changed, according to the embodiment.

In one example, as shown by the broken line on the periphery of the content item 310b in (b) of FIG. 13, the display control unit 110 blinks the content item 310b in such a manner that the content item 310b moves backward and forward of the content item 310a at predetermined time intervals. Alternatively, as illustrated in (a) of FIG. 14, the display control unit 110 causes the display mode of an area 316 in which the overlap relationship is changed in the content item 310b to be different from other areas of the content item 310b. In one example, the display control unit 110 causes only the area 316 in which the overlap relationship is changed to form a wire pattern or to be translucent.

Figure 14:
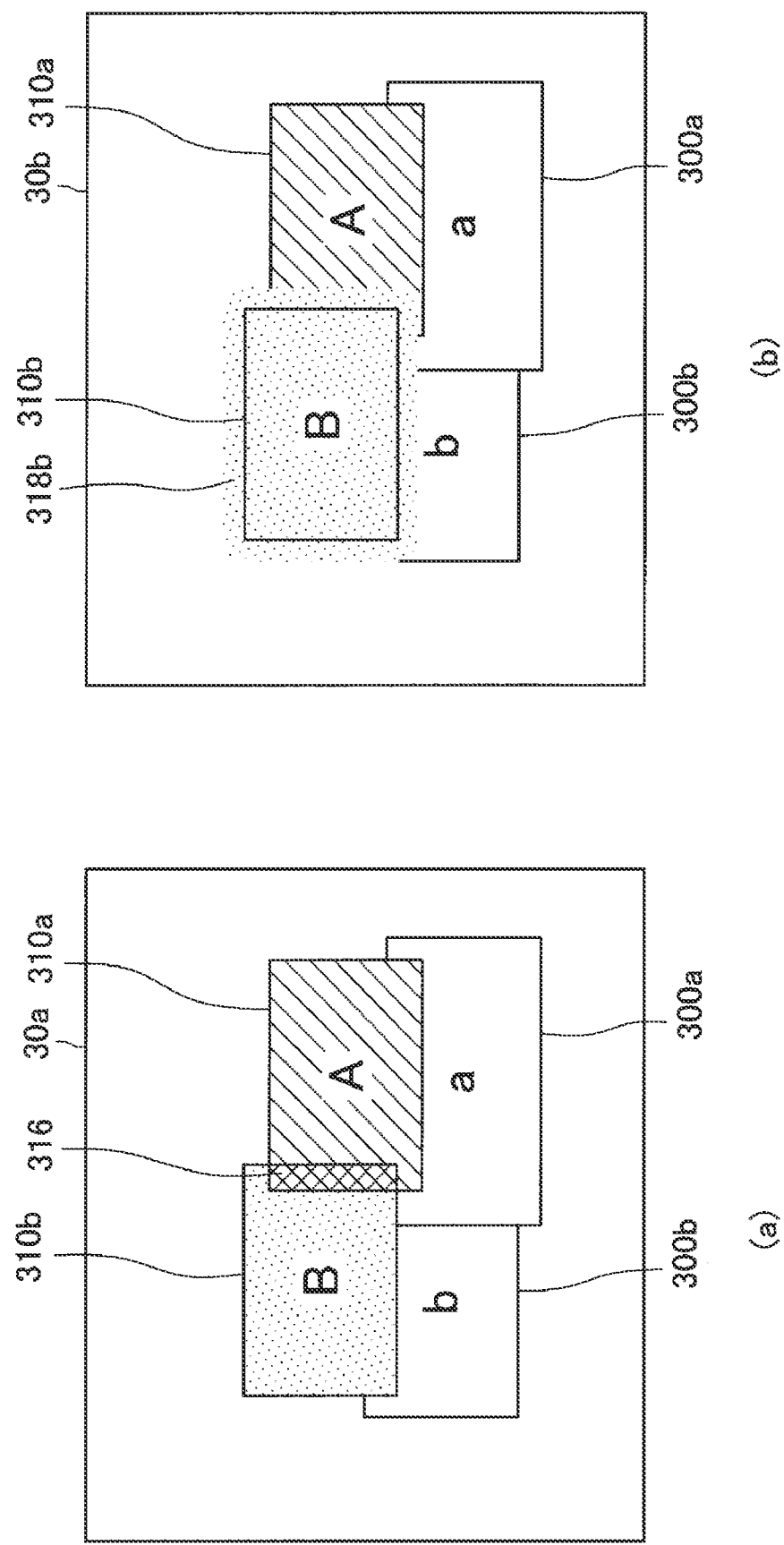
FIG. 14 is a diagram illustrated to describe a display example of content in a case where the overlap relationship between content items A and B is changed, according to the embodiment.

Alternatively, as illustrated in (b) of FIG. 14, the display control unit 110 superimposes, with respect to only the content (i.e., the content item 310b) moved to the front, a decoration 318 such as a glow onto the outer peripheral portion of the content. According to these display examples, it is possible for the user to easily understand that the overlap relationship is changed in such a manner that the content item 310b is closer to the front than the content item 310a.

2-1-7. Communication Unit 120

The communication unit 120 transmits and receives information to and from other devices that can communicate with the HMD 10. In one example, the communication unit 120 transmits a request to acquire a specific content item to the server 20 under the control of the content acquisition unit 102. In addition, the communication unit 120 receives content from the server 20.

2-1-8. Sensor Unit 122

The sensor unit 122 includes, in one example, a triple axis accelerometer, a gyroscope, a magnetometric sensor, an image sensor, a depth sensor, or the like. In one example, the sensor unit 122 measures the speed, acceleration, inclination, azimuth, or the like of the HMD 10. In addition, the sensor unit 122 captures an image of the eyes of the user who wears the HMD 10. In addition, the sensor unit 122 detects an object located in front of the user or detects the distance to the detected object.

Further, the sensor unit 122 may include a positioning device that receives a positioning signal from a positioning satellite such as a global positioning system (GPS) and measures a current position. In addition, the sensor unit 122 may include a range sensor.

2-1-9. Display Unit 124

The display unit 124 displays a picture by light emission. In one example, the display unit 124 has an image projection device, and causes the image projection device to project a picture by setting at least a partial area of each of the left eye lens and the right eye lens as a projection plane. Moreover, the left eye lens and the right eye lens can be formed of a transparent material such as resin or glass.

Moreover, in a modified example, the display unit 124 may have a liquid crystal panel, and the transmittance of the liquid crystal panel may be controllable. This allows the display unit 124 to be controlled in a transparent or translucent state.

Further, in another modified example, the display unit 124 may be configured as an opaque display device, and the pictures in the user's gaze direction that are captured by the sensor unit 122 may be sequentially displayed. In one example, the display unit 124 may be constituted by a liquid crystal display (LCD), an organic light emitting diode (OLED), or the like.

2-1-10. Storage Unit 126

The storage unit 126 stores various data or various types of software.

Moreover, the HMD 10 according to the present embodiment is not limited to the above-described configuration. In one example, the sensor unit 122 may be included in another device (not shown) capable of communicating with the HMD 10 rather than being included in the HMD 10.

2-2. Operation

Figure 15:
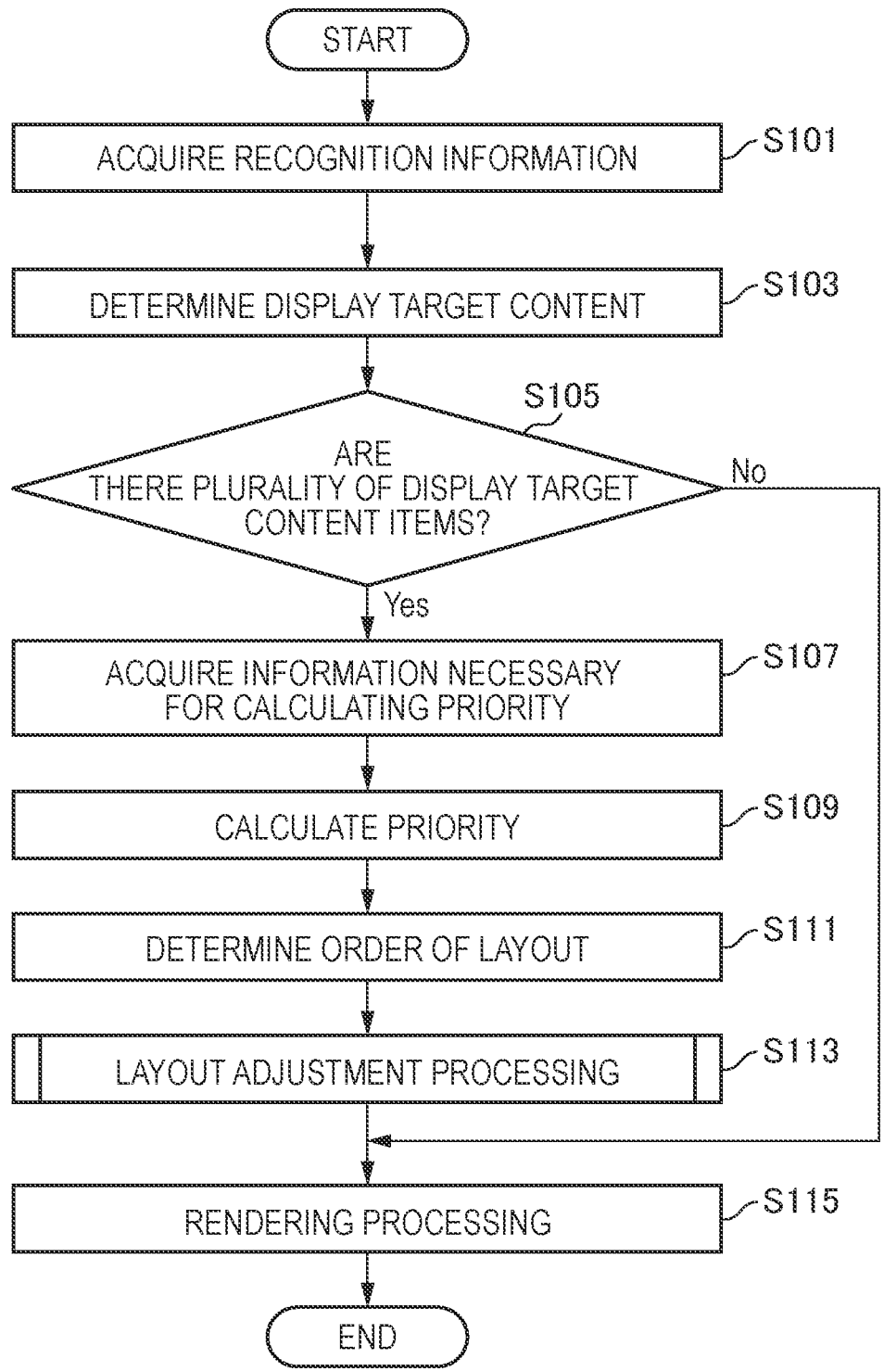
FIG. 15 is a flowchart illustrating an operation example according to the embodiment.

The configuration according to the present embodiment is described above. An operation example according to the present embodiment is now described with reference to FIG. 15. FIG. 15 is a flowchart illustrating an example of the operation according to the present embodiment.

2-2-1. Overall Procedure

As illustrated in FIG. 15, the detection result acquisition unit 104 of the HMD 10 first acquires recognition information necessary for determining the display target content (S101). Here, the recognition information is, in one example, position information of the current position, a recognition result of an object located in front of the user, or the like. In addition, in a case where a marker is attached to the object, the detection result acquisition unit 104 acquires information associated with the marker by inquiring of, in one example, the server 20 about it.

Subsequently, the display control unit 110 determines the display target content on the basis of the recognition information acquired in S101 (S103). Moreover, in a case where a plurality of applications are activated at the same time, the display control unit 110 may determine the display target content for each of the plurality of applications.

Then, the display control unit 110 determines whether there are a plurality of display target content items (S105). In a case where the display target content item is one or less (No in S105), the HMD 10 performs the processing of S115 to be described later.

On the other hand, in a case where there are a plurality of display target content items (Yes in S105), the HMD 10 acquires content information of each of the plurality of content items, the detection result of the user's gaze point, or the like (S107).

Subsequently, the priority determination unit 106 determines the priority of each of the plurality of content items on the basis of the information acquired in S107 (S109).

Subsequently, the display control unit 110 determines the adjustment order of layout of the pluralities of content items on the basis of the priority determined for each of the plurality of content items (S111). In one example, the display control unit 110 determines the adjustment order of the layout of the plurality of content items in such a manner that the higher the priority determined for each of the plurality of content items is, the higher the adjustment order of the layout is.

Subsequently, the HMD 10 performs a "layout adjustment processing" to be described later (S113).

Then, the display control unit 110 causes the display target content to be displayed on the display unit 124 on the basis of the adjustment result of the layout in S113 (S115).

2-2-2. Layout Adjustment Processing

Figure 16:
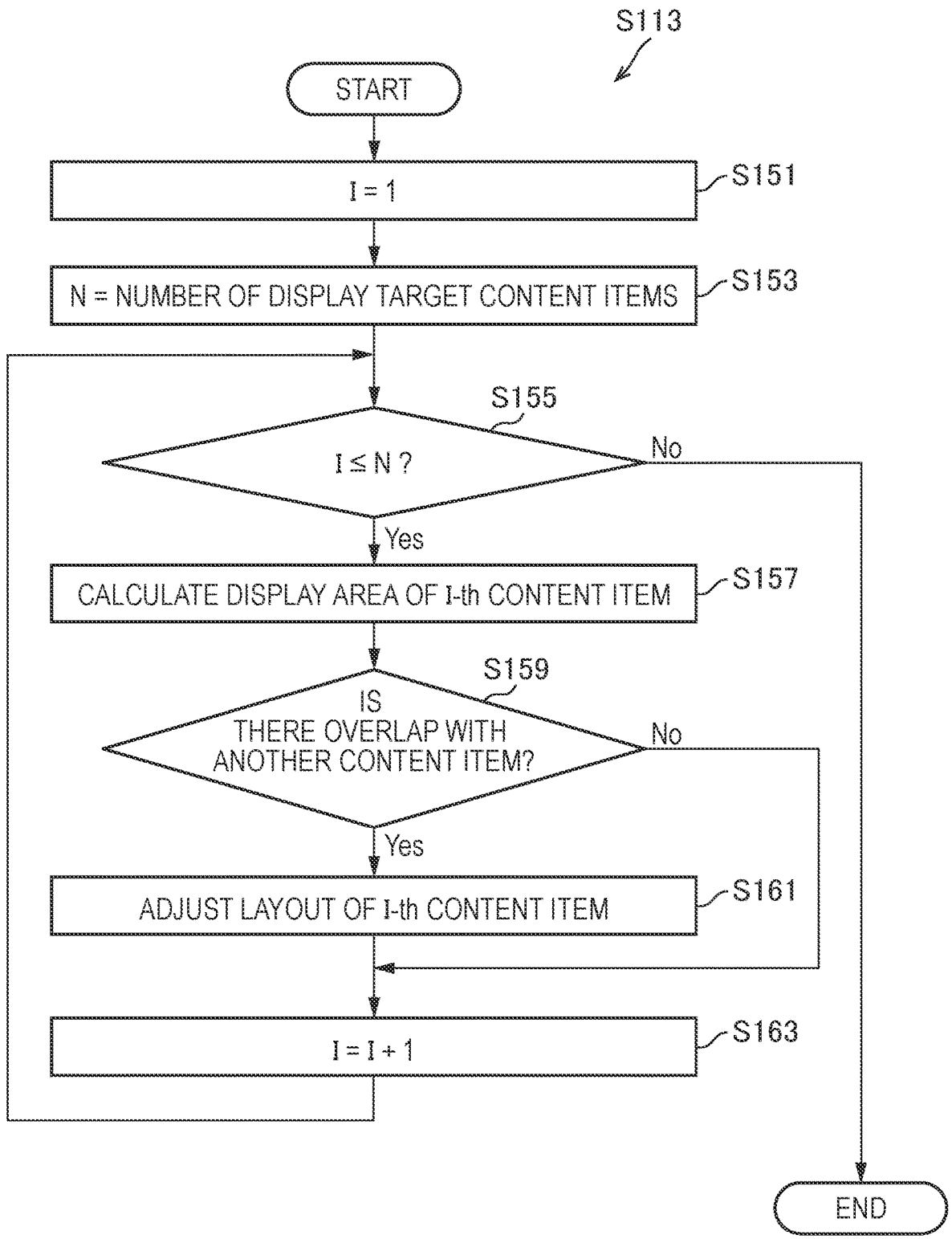
FIG. 16 is a flowchart illustrating an operation example of "layout adjustment processing" according to the embodiment.

The details of "layout adjustment processing" in S113 are now described specifically with reference to FIG. 16. As illustrated in FIG. 16, the display control unit 110 first sets a variable I indicating the number of the content items to be processed to "1" (S151). Then, the display control unit 110 sets the total number of display target content items to N (S153).

Subsequently, the display control unit 110 determines whether I is equal to or less than N (S155). In a case where I is larger than N (No in S155), the "layout adjustment processing" is terminated.

On the other hand, in a case where I is less than or equal to N (Yes in S155), the display control unit 110 first determines the content whose layout adjustment order determined in S111 is the I-th as the processing target. Then, the display control unit 110 calculates the display area of the content, in one example, on the basis of setting information or the like of the content (S157). In one example, the display control unit 110 calculates the display area of the content on the basis of the setting information or the like of the relative position from the object to be superimposed.

Subsequently, the display control unit 110 determines whether the display area of the calculated I-th processing target content item overlaps with the display area of another content item previously adjusted (S159). In a case where there is no overlap with the display area of the other content item (No in S159), the display control unit 110 performs the processing of S163 to be described later.

On the other hand, in a case where there is an overlap with the display area of the other content (Yes in S159), the display control unit 110 adjusts the layout of the I-th processing target content (S161). In one example, the display control unit 110 moves the display position of the I-th processing target content in such a manner to prevent from overlapping with the adjusted other content.

Then, the display control unit 110 adds "1" to I (S163). Then, the display control unit 110 performs the processing of S155 again.

2-3. Advantageous Effect

2-3-1. First Advantageous Effect

As described above, in the case where the display areas of a plurality of display target content items overlap each other at least partially, the HMD 10 according to the present embodiment adjusts the layout of one or more among the plurality of content items on the basis of the priority determined for each of the plurality of content items. This makes it possible to prevent the deterioration of the visual recognition of content in a scene where the plurality of content items are displayed.

In one example, it is possible for the HMD 10 to determine appropriately the priority for each of the display target content items, depending on the position of the user's gaze point, the characteristics of the display target content, or the like. Then, the HMD 10 adjusts the layout of the content with the lower priority in such a manner that the layout (e.g., display position or display size) of the content with higher priority is maintained and the content items do not overlap each other. Thus, the layout is optimally adjusted in such a manner that a plurality of content items do not overlap, such as a case where the layout of the content the user is paying attention to is maintained. Consequently, it is possible to prevent the visual recognition and usability from being impaired even in the case where a plurality of content items are simultaneously displayed.

2-3-2. Second Advantageous Effect

Further, it is possible for the HMD 10 to select an optimum layout adjustment method, in one example, depending on the characteristics of the display target content. Thus, it is possible to eliminate the necessity for, in one example, the developer of the application, to adjust manually the layout of the content.

3. HARDWARE CONFIGURATION

Figure 17:
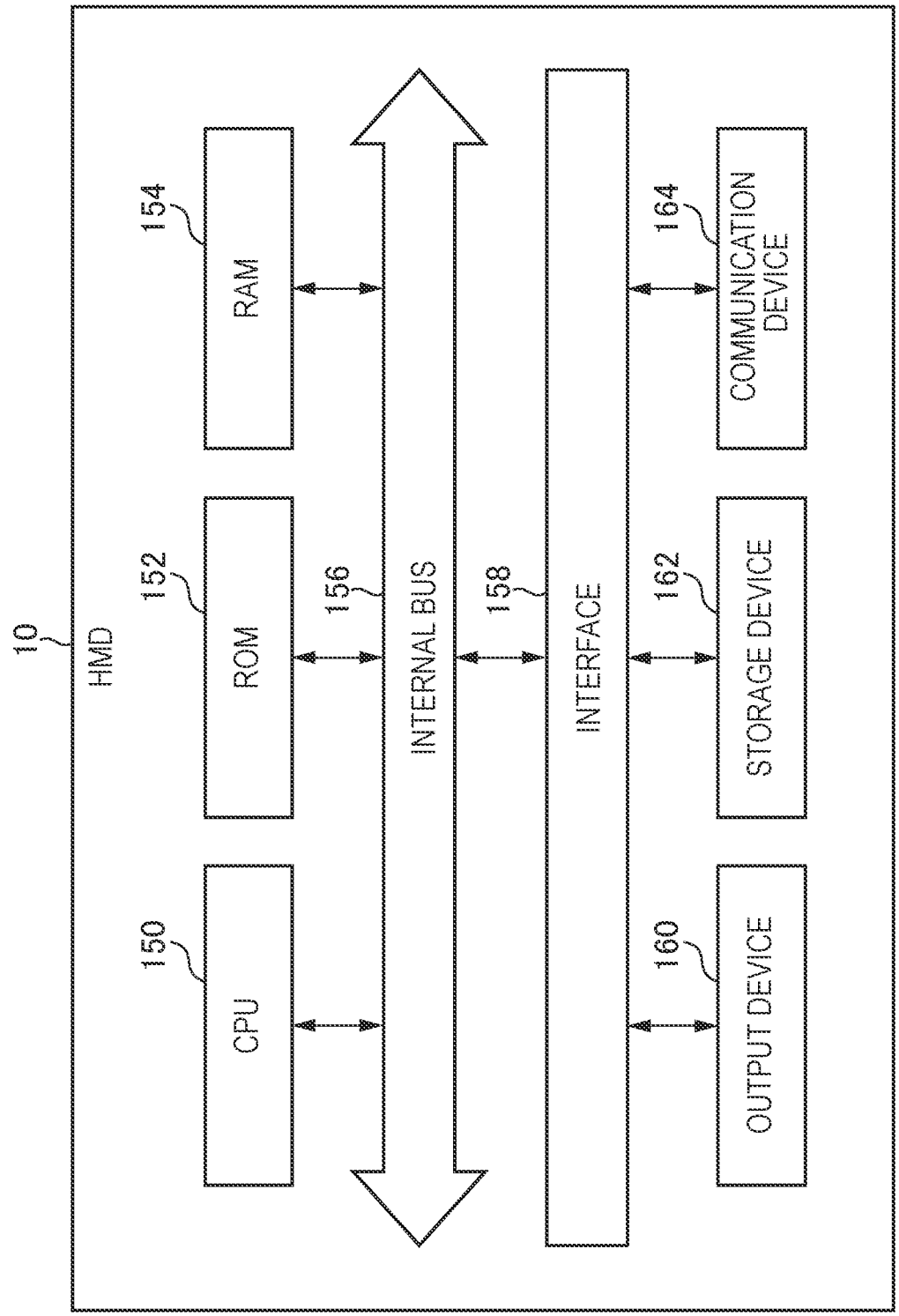
FIG. 17 is a diagram illustrated to describe a hardware configuration of the HMD 10 according to the embodiment.

The hardware configuration of the HMD 10 according to the present embodiment is now described with reference to FIG. 17. As illustrated in FIG. 17, the HMD 10 includes a CPU 150, a ROM 152, a RAM 154, an internal bus 156, an interface 158, an output device 160, a storage device 162, and a communication device 164.

The CPU 150 functions as an arithmetic processing unit and a control unit, and controls the overall operation in the HMD 10 in accordance with various programs. In addition, the CPU 150 implements the function of the control unit 100. The CPU 150 includes a processor such as a microprocessor.

The ROM 152 stores a program, control data such as operation parameter, or the like, which is used by the CPU 150.

The RAM 154 temporarily stores, in one example, a program executed by the CPU 150.

The internal bus 156 includes a CPU bus or the like. The internal bus 156 mutually connects the CPU 150, the ROM 152, and the RAM 154.

The interface 158 connects the internal bus 156 with the output device 160, the storage device 162, and the communication device 164.

The output device 160 includes, in one example, a projector, a liquid crystal display (LCD) device, an organic light emitting diode (OLED) device, a lamp, or the like. In addition, the output device 160 includes an audio output device such as a loudspeaker.

The storage device 162 is a device for storing data, which functions as the storage unit 126. The storage device 162 includes, in one example, a storage medium, a recording device that records data in the storage medium, a reading device that reads data from the storage medium, a deletion device that deletes data recorded in the storage medium, or the like.

The communication device 164 is a communication interface constituted by a communication device or the like for connecting to, in one example, the communication network 22. In addition, the communication device 164 may be a wireless LAN compatible communication device, a long term evolution (LTE) compatible communication device, or a wire communication device performing wired communication. The communication device 164 functions as the communication unit 120.

4. MODIFIED EXAMPLES

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

4-1. First Modified Example

In one example, although the embodiment described above describes the example in which the information processing device according to the present disclosure is the HMD 10, it is not limited to such an example. In one example, the information processing device may be, in one example, a projection device that renders an image on the retina by laser light.

Alternatively, the information processing device may be other types of portable device including a mobile phone such as smartphones, a tablet terminal, a wristwatch type computer, or the like.

4-2. Second Modified Example

Further, all of the components included in the control unit 100 described above may be provided in the server 20 instead of the HMD 10. Then, in this case, the information processing device according to the present disclosure can be the server 20, rather than the HMD 10. Moreover, the information processing device is not limited to the server 20, but may be other types of devices connectable to the communication network 22, such as personal computers (PCs) or game consoles.

Further, according to the embodiment described above, it is also possible to provide a computer program for causing the hardware such as the CPU 150, the ROM 152, and the RAM 154 to execute the function equivalent to each component of the HMD 10 according to the above embodiment. In addition, a recording medium having the computer program recorded thereon is also provided.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

a display control unit configured to output display information used to cause content associated with a real object to be displayed, in which the display control unit, in a case where a first area on which first content is displayed and a second area on which second content is displayed overlap at least partially, adjusts layout of the first content or the second content on a basis of layout information determined for each of the first content and the second content.

(2)

The information processing device according to (1), further including: a layout information determination unit configured to determine layout information of the first content and layout information of the second content on a basis of a predetermined index.

(3)

The information processing device according to (2), in which the layout information includes a priority.

(4)

The information processing device according to (2) or (3), in which the predetermined index is first information associated with the first content or second information associated with the second content.

(5)

The information processing device according to (4), in which the first information and the second information are information associated with the real object.

(6)

The information processing device according to (4) or (5), in which the first information is information indicating characteristics of the first content, and the second information is information indicating characteristics of the second content.

(7)

The information processing device according to (6), in which the characteristics of the first content include a type of the first content, and the characteristics of the second content include a type of the second content.

(8)

The information processing device according to any one of (2) to (7), in which the predetermined index is information related to a user.

(9)

The information processing device according to (8), in which the information related to the user is information corresponding to detection of a gaze of the user.

(10)

The information processing device according to (9), in which the information corresponding to detection of the user's gaze is position information of a detected gaze point of the user.

(11)

The information processing device according to any one of (8) to (10), in which the information related to the user is a result of recognition of behavior of the user.

(12)

The information processing device according to any one of (4) to (11), in which the predetermined index is information indicating evaluation related to the first content or the second content in a predetermined social networking service.

(13)

The information processing device according to any one of (4) to (12), in which the predetermined index is information of an advertising rate related to the first content or the second content.

(14)

The information processing device according to any one of (2) to (13), in which the layout information determination unit determines the layout information of the first content on a basis of the layout information of the first content that is determined for each of a plurality of the predetermined indices, and determines the layout information of the second content on a basis of the layout information of the second content that is determined for each of a plurality of the predetermined indices.

(15)

The information processing device according to any one of (4) to (7), in which, the layout information includes overlap allowance, the layout information determination unit determines overlap allowance related to the first content on a basis of the first information and determines overlap allowance related to the second content on a basis of the second information, and the display control unit adjusts the layout of the first content or the second content further on a basis of the overlap allowance related to the first content and the overlap allowance related to the second content.

(16)

The information processing device according to any one of (1) to (15), in which the display control unit changes a display position or a display size of the first content or the second content on the basis of the layout information determined for each of the first content and the second content.

(17)

The information processing device according to (16), in which the display control unit, in a case where the display position of the first content or the second content is changed, outputs display information used to cause a display indicating association between the content with changed display position and the real object to be further displayed.

(18)

The information processing device according to any one of (1) to (17), in which the display control unit changes overlap relationship between the first content and the second content on the basis of the layout information determined for each of the first content and the second content.

(19)

An information processing method including:

outputting display information used to cause content associated with a real object to be displayed; and adjusting, by a processor, in a case where a first area on which first content is displayed and a second area on which second content is displayed overlap at least partially, layout of the first content or the second content on a basis of layout information determined for each of the first content and the second content.

(20)

A program causing a computer to function as:
a display control unit configured to output display information used to cause content associated with a real object to be displayed,
in which the display control unit, in a case where a first area on which first content is displayed and a second area on which second content is displayed overlap at least partially, adjusts layout of the first content or the second content on a basis of layout information determined for each of the first content and the second content.

(21)

The information processing device according to any one of (1) to (18),
in which the layout information includes a priority, and
the display control unit adjusts the layout of the content determined as having lower priority of the first content and the second content.

(22)

The information processing device according to any one of (1) to (18),
in which the layout of the content includes a position, size, display color, or shape of the content.

(23)

The information processing device according to any one of (2) to (15),
in which the predetermined index is information related to environment in which a user is located.

(24)

The information processing device according to any one of (2) to (15),
in which the predetermined index is information related to a display device.

REFERENCE SIGNS LIST

10 HMD
20 server
22 communication network
100 control unit
102 content acquisition unit
104 detection result acquisition unit
106 priority determination unit
108 overlap allowance determination unit
110 display control unit
120 communication unit
122 sensor unit
124 display unit
126 storage unit

The invention claimed is:

1. An information processing device comprising:
a display control unit configured to output display information used to cause a plurality of contents associated with at least one real object to be displayed having initial layouts and with an image of the at least one real object captured by a sensor,
wherein the plurality of contents are not captured by the sensor and are acquired from a server or storage after the image of the real object is captured by the sensor such that the plurality of contents are different from the image of the at least one real object,
wherein the display control unit, in a case where a first area on which a first content of the plurality of contents is displayed and a second area on which a second content of the plurality of contents is displayed overlap at least partially and the second content includes text and does not initially include a background display, selects, based on layout information of the first content and layout information of the second content, between adding the background display to the second content to be displayed in front of the first content and adding the background display to the second content to be displayed behind the first content, and
wherein the display control unit is implemented via at least one processor.

2. The information processing device according to claim 1, further comprising:
a layout information determination unit configured to determine, based on a predetermined index of the first content and a predetermined index of the second content, the layout information of the first content and the layout information of the second content,
wherein the layout information determination unit is implemented via at least one processor.

3. The information processing device according to claim 2,
wherein the layout information of the first content includes a priority of the first content and the layout information of the second content includes a priority of the second content.

4. The information processing device according to claim 3,
wherein the layout information determination unit determines the priority of the first content on a basis of the predetermined index of the first content and the predetermined index of the second content, and determines the priority of the second content on a basis of the predetermined index of the second content and the predetermined index of the first content.

5. The information processing device according to claim 2,
wherein the predetermined index of the first content includes first information associated with the first content and the predetermined index of the second content includes second information associated with the second content.

6. The information processing device according to claim 5,
wherein the first information and the second information include information associated with the at least one real object.

7. The information processing device according to claim 5,
wherein the first information includes information indicating characteristics of the first content, and
the second information includes information indicating characteristics of the second content.

8. The information processing device according to claim 7,
wherein the characteristics of the first content include a type of the first content, and
the characteristics of the second content include a type of the second content.

9. The information processing device according to claim 5,
wherein the predetermined index of the first content includes information indicating evaluation related to the first content in a predetermined social networking service and the predetermined index of the second content includes information indicating evaluation related to the second content in the predetermined social networking service.

10. The information processing device according to claim 5, wherein the predetermined index of the first content includes information of an advertising rate related to the first content and the predetermined index of the second content includes information of an advertising rate related to the second content.

11. The information processing device according to claim 5,
wherein the layout information of the first content and the layout information of the second content include overlap allowance,
the layout information determination unit determines overlap allowance related to the first content on a basis of the first information and determines overlap allowance related to the second content on a basis of the second information, and
the display control unit adjusts the initial layout of the first content or the initial second content further on a basis of the overlap allowance related to the first content and the overlap allowance related to the second content.

12. The information processing device according to claim 2,
wherein the predetermined index of the first content and the predetermined index of the second content include information related to a user.

13. The information processing device according to claim 12,
wherein the information related to the user includes information corresponding to detection of a gaze of the user.

14. The information processing device according to claim 13,
wherein the information corresponding to detection of the gaze of the user includes position information of a detected gaze point of the user.

15. The information processing device according to claim 12,
wherein the information related to the user is a result of recognition of behavior of the user.

16. The information processing device according to claim 1,
wherein the display control unit changes a display position or a display size of the first content or the second content on the basis of the layout information of the first content and the layout information of the second content.

17. The information processing device according to claim 16,
wherein the display control unit, in a case where the display position of the first content or the second content is changed, outputs display information used to cause a display indicating association between the content with changed display position and the image of the at least one real object to be further displayed.

18. The information processing device according to claim 1,
wherein the display control unit changes an overlap relationship between the first content and the second content on the basis of the layout information of the first content and the layout information of the second content.

19. An information processing method comprising:
outputting display information used to cause a plurality of contents associated with at least one real object to be displayed having initial layouts and with an image of the at least one real object captured by a sensor, wherein the plurality of contents are not captured by the sensor and are acquired from a server or storage after the image of the real object is captured by the sensor such that the plurality of contents are different from the image of the at least one real object; and
selecting, by a processor, in a case where a first area on which a first content of the plurality of contents is displayed and a second area on which a second content of the plurality of contents is displayed overlap at least partially and the second content includes text and does not initially include a background display, and based on layout information of the first content and layout information of the second content, between adding the background display to the second content to be displayed in front of the first content and adding the background display to the second content to be displayed behind the first content.

20. A non-transitory computer-readable medium having embodied thereon a program which when executed by a computer causes the computer to execute a method, the method comprising:
outputting display information used to cause a plurality of contents associated with at least one real object to be displayed having initial layouts and with an image of the at least one real object captured by a sensor, wherein the plurality of contents are not captured by the sensor and are acquired from a server or storage after the image of the real object is captured by the sensor such that the plurality of contents are different from the image of the at least one real object; and
selecting, in a case where a first area on which a first content of the plurality of contents is displayed and a second area on which a second content of the plurality of contents is displayed overlap at least partially and the second content includes text and does not initially include a background display, and based on layout information of the first content and layout information of the second content, between adding the background display to the second content to be displayed in front of the first content and adding the background display to the second content to be displayed behind the first content.

* * * * *